United States Patent [19]
Fujino et al.

[11] Patent Number: 5,651,006
[45] Date of Patent: Jul. 22, 1997

[54] HIERARCHICAL NETWORK MANAGEMENT SYSTEM

[75] Inventors: Shuji Fujino, Ebina; Masato Saito, Yokohama; Takashi Kagei, Sagamihara; Yasuhiro Tanaka, Tokyo; Shinichi Nakazaki; Yoshinori Ooba, both of Yokohama, all of Japan

[73] Assignee: Hitachi, Ltd., Tokyo, Japan

[21] Appl. No.: 461,524

[22] Filed: Jun. 5, 1995

[30] Foreign Application Priority Data

Jun. 14, 1994 [JP] Japan .................. 6-132286

[51] Int. Cl.⁶ .................. H04J 3/02; H04L 12/66
[52] U.S. Cl. .................. 370/408; 370/902; 395/200.02; 395/300
[58] Field of Search .................. 370/60, 94.1, 94.3, 370/85.13, 85.14, 85.8, 408, 902, 389, 400, 401, 402; 395/300, 200.01, 200.02, 200.05, 200.11

[56] References Cited

U.S. PATENT DOCUMENTS

| | | | |
|---|---|---|---|
| 5,185,860 | 2/1993 | Wu | 395/200.11 |
| 5,434,863 | 7/1995 | Onishi et al. | 370/85.9 |
| 5,471,617 | 11/1995 | Farrand et al. | 395/700 |
| 5,485,455 | 1/1996 | Dobbins et al. | 370/60 |
| 5,495,607 | 2/1996 | Pisello et al. | 395/600 |

*Primary Examiner*—Douglas W. Olms
*Assistant Examiner*—Min Jung
*Attorney, Agent, or Firm*—Antonelli, Terry, Stout & Kraus, LLP

[57] ABSTRACT

A hierarchical communication network management system is structured by a plurality of agents and sub-managers connected to lower communication networks and an integration manager connected to a higher communication network. Each of the sub-managers functions as an agent to the integration manager and functions as a manager to each agent, so that it becomes possible to employ a Simple Network Management Protocol (SNMP) between each agent and its sub-manager and between a sub-manager and the integration manager.

17 Claims, 39 Drawing Sheets

FIG.4

SUBMANAGER-MIB-EXAMPLE DEFINITIONS ::= BEGIN

IMPORTS
enterprises, NetworkAddress, IpAddress, Counter, Gauge, TimeTicks
   FROM RFC1155-SMI
OBJECT-TYPE
   FROM RFC-1212
DisplayString, IfEntry, AtEntry, IpAddrEntry, IpRouteEntry,
IpNetToMediaEntry, PhysAddress, TcpConnEntry, UdpEntry, EgpNeighEntry
   FROM RFC1213-MIB
TRAP-TYPE
   FROM RFC-1215;

hitachi    OBJECT IDENTIFIER ::= { enterprises 116 }
systemExMib  OBJECT IDENTIFIER ::= { hitachi 5 }
hiuxwe2   OBJECT IDENTIFIER ::= { systemExMib 5 }
cometMibs OBJECT IDENTIFIER ::= { hiuxwe2 1 }
hierarchy  OBJECT IDENTIFIER ::= { cometMibs 4 }
standard  OBJECT IDENTIFIER ::= { hierarchy 1 }
extension  OBJECT IDENTIFIER ::= { hierarchy 2 }
smgTotal  OBJECT IDENTIFIER ::= { standard 1 }
smgIpNode OBJECT IDENTIFIER ::= { standard 2 } smgSumTcp OBJECT IDENTIFIER ::= { extension 1 }

-- SUB-MANAGER PERIODICAL COLLECTION MIB GROUP
   ( The Submanager Collection group )
-- STRUCTURED BY THE SUB-MANAGER TOTAL GROUP AND THE
   SUB-MANAGER IP NODE GROUP
-- SUB-MANAGER TOTAL GROUP
   ( the Submanager Total group )
smgTotalManagedNodeNumber OBJECT-TYPE
   SYNTAX INTEGER ( 0..65535 )
   ACCESS read-only
   STATUS mandatory
   DESCRIPTION
     " SHOWS THE NUMBER OF IP NODE FOR MANAGEMENT "
::= { smgTotal 1 } smgTotalCriticalNodeNumber OBJECT-TYPE
   SYNTAX INTEGER ( 0..65535 )
   ACCESS read-only
   STATUS mandatory
   DESCRIPTION
     " SHOWS THE NUMBER OF NODE WHICH IS CRITICAL WITH
       THE SUB-MANAGER "
::= { smgTotal 2 }

FIG.5

```
smgTotalMarginalNodeNumber OBJECT-TYPE
    SYNTAX  INTEGER ( 0..65535 )
    ACCESS  read-only
    STATUS  mandatory
    DESCRIPTION
        " SHOWS THE NUMBER OF NODES IN WHICH THERE IS A TCP
          / IP INTERFACE WHICH CAN COMMUNICATE WITH THE SUB-
          MANAGER BUT WHICH ARE NOT OPERATING "
    : : = { smgTotal 3 } smgTotalNormalNodeNumber OBJECT-TYPE
    SYNTAX  INTEGER ( 0..65535 )
    ACCESS  read-only
    STATUS  mandatory
    DESCRIPTION
        " SHOWS THE NUMBER OF NODES IN WHICH ALL THE TCP /
          IP INTERFACES ARE OPERATING "
    : : = { smgTotal 4 } smgTotalRouterNodeNumber OBJECT-TYPE
    SYNTAX  INTEGER ( 0..65535 )
    ACCESS  read-only
    STATUS  mandatory
    DESCRIPTION
        " SHOWS THE NUMBER OF ROUTERS WHICH ARE WITHIN THE
          MANAGEMENT RANGE OF THE SUB-MANAGER "
    : : = { smgTotal 5 } smgTotalSnmpSupportNodeNumber OBJECT-TYPE
    SYNTAX  INTEGER ( 0..65535 )
    ACCESS  read-only
    STATUS  mandatory
    DESCRIPTION
        "SHOWS THE NUMBER OF NODES WHICH ARE LOADED WITH
          SNMP WITHIN THE MANAGEMENT RANGE OF THE SUB-
          MANAGER "
    : : = { smgTotal 6 }

-- SUB-MANAGER IP NODE GROUP
   ( the Submanager IpNode group )

smgIpNodeTable OBJECT-TYPE
    SYNTAX  SEQUENCE OF SmgIpNodeEntry
    ACCESS  not-accessible
    STATUS  mandatory
    DESCRIPTION
        " SHOWS A LIST OF INFORMATION RELATING TO THE IP NODE
          WITHIN THE MANAGEMENT RANGE OF THE SUB-MANAGER "
    : : = { smgIpNode 1 } smgIpNodeEntry OBJECT-TYPE
    SYNTAX  SmgIpNodeEntry
    ACCESS  not-accessible
    STATUS  mandatory
    INDEX   { smgIpNodeIndex }
    : : = { smgIpNodeTable 1 }
```

FIG.6

```
SmgIpNodeEntry ::= SEQUENCE {
                    smgIpNodeIndex    INTEGER
                    smgIpNodeContext  Display String
                  } smgIpNodeIndex OBJECT-TYPE
    SYNTAX  INTEGER (..65535)
    ACCESS  read-only
    STATUS  mandatory
    DESCRIPTION
        " A UNIQUE VALUE FOR EACH SYSTEM
          THIS VALUE MUST BE CONSTANT UNTIL THE SUB-
          MANAGER HAS BEEN RE-INITIALIZED "
    ::= { smgIpNodeEntry 1 } smgIpNodeContext OBJECT-TYPE
    SYNTAX  DisplayString
    ACCESS  read-only
    STATUS  mandatory
    DESCRIPTION
        " AN ENTRY WHICH INCLUDES INFORMATION FOR EACH IP
          NODE WITHIN THE MANAGEMENT RANGE
          THE FOLLOWING INFORMATION ARE INCLUDED :
          (1) IP ADDRESS :  SHOWS THE IP ADDRESS USED FOR
                            THE INTEGRATION MANAGER TO
                            COMMUNICATE WITH THE HOST
                            A SOFTWARE LOOP-BACK ADDRESS IS
                            NOT USED
          (2) HOST NAME :   SHOWS THE HOST NAME OF THE IP
                            NODE WITHIN THE MANAGEMENT RANGE
                            A NAME DEFINED IN THE /etc/hosts
                            WITHIN THE HOST OF WHICH SUB-
                            MANAGER IS OPERATING IS USED
                            IF THE NAME IS NOT DEFINED, THIS
                            ITEM BECOMES A BLANK
          (3) STATUS :      SHOWS THE STATUS OF THE IP NODE
                            WITHIN THE MANAGEMENT RANGE
                            THERE ARE THE FOLLOWING STATUSES :
                              (a) NORMAL   (Normal)
                              (b) MARGINAL (Marginal)
                              (c) CRITICAL (Critical)
          (4) PING RESPONSE TIME :  SHOWS A RESPONSE TIME OF
                                    THE PING TO THE IP NODE
          (5) SNMP SUPPORT
              INFORMATION :  SHOWS WHETHER THE IP NODE OF
                             THE MANAGEMENT RANGE SUPPORTS
                             THE SNMP OR NOT
                             THERE ARE THE FOLLOWING VALUES :
                               (a) SUPPORT      (snmp)
                               (b) NOT SUPPORT  (nonsnmp)
          (6) ROUTER INFORMATION :  SHOWS WHETHER THE IP NODE
                                    WITHIN THE MANAGEMENT RANGE
                                    IS A ROUTER OR NOT
                                    THERE ARE THE FOLLOWING
                                    VALUES :
                                      (a) ROUTER      (router)
                                      (b) NOT A ROUTER (host)
          AN EXAMPLE OF OUTPUT IS SHOWN BELOW
          203.200.100.150. host001  Normal          10 nonsnmp router "
    ::= { smgIpNodeEntry 2 }
```

FIG.7

```
-- SUB-MANAGER REAL-TIME COLLECTION MIB GROUP
   (The Submanager Summary Tcp group)

smgSumTcpTable OBJECT-TYPE
    SYNTAX  SEQUENCE OF SmgSumTcpEntry
    ACCESS  not-accessible
    STATUS  mandatory
    DESCRIPTION
        " SHOWS THE LIST OF TCP COLLECTION WITHIN THE
          MANAGEMENT RANGE OF THE SUB-MANAGER "
    : : = { smgSumTcp 1 } smgSumTcpEntry OBJECT-TYPE
    SYNTAX   SmgSumTcpEntry
    ACCESS   not-accessible
    STATUS   mandatory
    INDEX    { smgSumTcpServerIpAddress, smgSumTcpServerPortNumber,
               smgSumTcpClientIpAddress, smgSumTcpClientPortNumber }
    : : = { smgSumTcpTable 1 }

SmgSumTcpEntry : : = SEQUENCE {
                        smgSumTcpServerIpAddress
                            IpAddress,
                        smgSumTcpServerPortNumber
                            INTEGER,
                        smgSumTcpClientIpAddress
                            IpAddress,
                        smgSumTcpClientPortNumber
                            INTEGER,
                        smgSumTcpContext
                            Display String
                     }
smgSumTcpServerIpAddress OBJECT-TYPE
    SYNTAX  IpAddress
    ACCESS  read-only
    STATUS  mandatory
    DESCRIPTION
        " SHOWS THE IP ADDRESS AT WHICH THE TCP CONNECTION IS
          OPENED "
    : : = { smgSumTcpEntry 1 } smgSumTcpServerPortNumber OBJECT-TYPE
    SYNTAX  INTEGER ( 0..65535 )
    ACCESS  read-only
    STATUS  mandatory
    DESCRIPTION
        "SHOWS THE PORT NUMBER WHICH IS USED BY THE NODE
         DEFINED BY smgSumTcpServerIpAddress "
    : : = { smgSumTcpEntry 2 }
```

FIG.8

```
smgSumTcpClientIpAddress OBJECT-TYPE
    SYNTAX   IpAddress
    ACCESS   read-only
    STATUS   mandatory
    DESCRIPTION
        " SHOWS THE IP ADDRESS (THE OTHER PARTY DEFINED BY
          smgSumTcpSreverIpAddress) AT WHICH THE TCP CONNECTION IS
          OPENED IN THIS SERVICE "
    ::= { smgSumTcpEntry 3 } smgSumTcpClientPortNumber OBJECT-TYPE
    SYNTAX   INTEGER
    ACCESS   read-only
    STATUS   mandatory
    DESCRIPTION
        " SHOWS THE PORT NUMBER WHICH IS USED BY THE IP NODE
          DEFINED BY smgSumTcpClientIpAddress "
    ::= { smgSumTcpEntry 4 } smgSumTcpContext OBJECT-TYPE
    SYNTAX   Display String
    ACCESS   read-only
    STATUS   mandatory
    DESCRIPTION
        " AN ENTRY OF THE CONNECTION INFORMATION OF TCP
          PROVIDED BY THE IP NODE OF THE MANAGEMENT RANGE "
          THE FOLLOWING INFORMATION ARE INCLUDED :
        (1) IP ADDRESS (PART 1):  SHOWS THE IP ADDRESS AT
                                  WHICH THE TCP CONNECTION
                                  IS OPENED
        (2) PORT NUMBER (PART 2): SHOWS THE PORT NUMBER
                                  WHICH IS USED BY IP NODE
                                  DEFINED IN (1) IN THIS TCP
                                  CONNECTION
        (3) STATUS
            (PART 1):  SHOWS THE STATUS OF THE TCP CONNECTION
                       OPENED BY THE IP NODE DEFINED IN (1)
                       THE FOLLOWING VALUES ARE SET :
                (a) unknown(0):      SHOWS WHETHER THE IP
                                     NODE ASSIGNED IN (1)
                                     SUPPORTS THE SNMP AND
                                     THE IP NODE IS OUTSIDE
                                     THE MANAGEMENT OF THE
                                     SUB-MANAGER
                (b) closed(1):       IS WAITING FOR ACK FROM
                                     THE OTHER TCP TO A
                                     DISCONNECTION REQUEST
                (c) listen(2):       IS WAITING FOR A CON-
                                     NECTION OPEN FROM OTHER
                                     TCP
                (d) synSent(3):      IS WAITING FOR A CON-
                                     NECTION RECEPTION FROM
                                     THE OTHER PARTY AFTER
                                     ISSUING A CONNECTION
                                     REQUEST
                (e) synReceived(4):  HAS RECEIVED A CON-
                                     NECTION REQUEST AND
                                     HAS ALSO ISSUED A
                                     CONNECTION REQUEST
                                     FROM THIS SIDE AND IS
                                     WAITING FOR ACK OF
                                     THIS REQUEST
                (f) established(5):  HAS A CONNECTION
                                     OPENED AND IS IN THE
                                     DATA TRANSFER PHASE
```

FIG.9

(g) fin Wait 1 (6): IS WAITING FOR A DISCONNECTION REQUEST FROM THE OTHER TCP OR HAS ISSUED A DISCONNECTION REQUEST AND IS WAITING FOR ACK OF THIS REQUEST (h) fin Wait 2 (7): IS WAITING FOR A DISCONNECTION REQUEST FROM THE OTHER TCP (i) close Wait (8): IS WAITING FOR A DISCONNECTION REQUEST FROM THE USER (j) last Ack (9): IS WAITING FOR ACK FROM THE OTHER TCP TO A DISCONNECTION REQUEST (k) closing (10): IS WAITING FOR ACK FROM THE OTHER TCP TO A DISCONNECTION REQUEST (l) timeWait (11): IS WAITING UNTIL THE ACK ISSUED FROM THIS SIDE HAS REACHED THE OTHER PARTY AND HAS BEEN PROCESSED (4) IP ADDRESS (PART 2): SHOWS THE IP ADDRESS OF THE IP NODE WHICH OPENS THE TCP CONNECTION (THE OTHER PARTY OF THE NODE DEFINED IN THE IP ADDRESS (1))

(5) PORT NUMBER (PART 2): SHOWS THE PORT NUMBER WHICH IS USED BY THE IP NODE DEFINED IN (5) IN THIS TCP CONNECTION (6) STATUS (PART 2): SHOWS THE STATUS OF THE TCP CONNECTION WHICH IS OPENED BY THE IP NODE DEFINED IN (5)
THE DEFINED VALUE IS DEFINED IN (4)

(7) SERVICE NAME: SHOWS THE SERVICE NAME WHICH USES THIS TCP CONNECTION
THE SERVICE NAME USED IS THE NAME DEFINED IN THE /etc/services OF THE HOST OF WHICH SUB-MANAGER IS OPERATING AN EXAMPLE OF OUTPUT IS SHOWN BELOW
203. 200. 100. 150  5648  established  200. 158. 123. 203  6300  unknown
ftp "

::= { smgSumTcpEntry 5 }

FIG.10

```
-- SUB-MANAGER EXTENSION TRAPS ( the submanager specific traps )

smgCreateSystemTrap TRAP-TYPE
        ENTERPRISE  submanager
        VARIABLES     { smgIpNodeIndex }
        DESCRIPTION
            " THE TRAPS ARE USED FOR POSTING THAT A SYSTEM
             HAS BEEN ADDED
             smgIpNodeIndex IS THE INDEX HELD BY THE ADDED
             SYSTEM "
::= 1 smgDeleteSystemTrap TRAP-TYPE
        ENTERPRISE  submanager
        VARIABLES     { smgIpNodeIndex }
        DESCRIPTION
            " THE TRAPS ARE USED FOR POSTING THAT A SYSTEM
             HAS BEEN DELETED
             smgIpNodeIndex IS THE INDEX HELD BY THE ADDED
             SYSTEM "
::= 2 smgIntermediaryTrap TRAP-TYPE
        ENTERPRISE  submanager
        VARIABLES     { smgTrapList }
        DESCRIPTION
            " RELAY TRAP
             VALUES OF THE ENTERPRISE CODE ( enterprise ) OF THE
             AGENT WHICH HAS ISSUED A TRAP TO BE RELAYED,
             THE NETWORK ADDRESS ( agent-addr ), THE STANDARD
             TRAP NUMBER ( generic-trap ) AND THE EXTENSION TRAP
             NUMBER ( specificTrap ) ARE SET TO THE variable-bindings
             FIELD AS THE VALUES OF smgEnterprise, smgAgentAddr,
             smgGenericTrap, AND smgSpecificTrap RESPECTIVELY
             THE VALUES OF THE variable-bindings FIELD OF THE
             RELAY TRAP CONSTITUTE A PART OF THE variable-
             bindings FIELD OF THE RELAY TRAP AND ARE RELAYED
             TO THE MANAGER
::= 3

SmgTrap ::=
        SEQUENCE {
            smgIpNodeIndex,
            smgEnterprise,
            smgAgentAddr,
            smgGenericTrap,
            smgSpecificTrap,
            variableBindings
        }

SmgTrapList ::=
        SEQUENCE OF
            SmgTrap

END
```

| ITEM NUMBER | INFORMATION TO BE COLLECTED | | MANAGEMENT OBJECT NAME OF THE SUB-MANAGER EXTENSION MIB TO BE CONVERTED | REMARKS |
|---|---|---|---|---|
| | MIB-II OBJECT NAME | OTHERS | | |
| 1 | atNetAddress (OR ipNetToMediaNetAddress) | /etc/hosts FILE | smgIpNodeContext | PERIODICAL COLLECTION MIB |
| 2 | — | ping | | |
| 3 | sysObjectID | — | | |
| 4 | ifNumber | — | | |
| 5 | ifType | — | | |
| 6 | ifOperStatus | — | | |
| 7 | ipForwarding | — | | |
| 8 | tcpConnState (tcpConnLocalAddress) (tcpConnLocalPort) (tcpConnRemAddress) (tcpConnRemPort) | /etc/services FILE | smgSumTcpContext smgSumTcpServerIpAddress smgSumTcpServerPortNumber smgSumTcpClientIpAddress smgSumTcpClientPortNumber | REAL-TIME COLLECTION MIB |

FIG.14

| ITEM NUMBER | CONTENTS OF smgIpNodeContext OF THE COLLECTION MIB TO BE TOTALED | MANAGEMENT OBJECT NAME OF THE COLLECTION MIB WHICH EXPRESSES THE TOTALED RESULT | REMARKS |
|---|---|---|---|
| 1 | NUMBER OF IP ADDRESSES (OR THE NUMBER OF smgIpNodeIndex) | smgTotalManagedNodeNumber | PERIODICAL COLLECTION MIB |
| 2 | STATUS | smgTotalCriticalNodeNumber | |
| 3 | | smgTotalMarginalNodeNumber | |
| 4 | | smgTotalNormalNodeNumber | |
| 5 | ROUTER INFORMATION | smgTotalRouterNodeNumber | |
| 6 | SNMP SUPPORT INFORMATION | smgTotalSnmpSupportNodeNumber | |

```
ENVIRONMENT SETTING FILE                                              — 180

OBTAINING COMMUNITY FILE NAME = public                                — 400
SETTING COMMUNITY NAME = abc                                          — 410
TRAP DESTINATION = 203. 68. 48. 53         # IP ADDRESS OF TRAP       — 420a  } 420
                                             POSTING DESTINATION
TRAP DESTINATION = 192. 67. 113. 4         # IP ADDRESS OF TRAP       — 420b
                                             POSTING DESTINATION      — 430
MANAGEMENT RANGE NUMBER = 50                                          — 440a } 440
MANAGEMENT ADDRESS RANGE = 200. 10. 20. 1-70 : : : :                  — 440b
MANAGEMENT ADDRESS RANGE = 200. 10. 20. 100 : : : :
TRAP RELAY INTERVAL = 20                   # MINUTE UNIT              — 450
```

* A DEFAULT OF THE MANAGEMENT RANGE NUMBER 430 IS SET AS "100".
* THE METHOD FOR DESCRIBING THE MANAGEMENT ADDRESS RANGE 440 IS
  "MANAGEMENT ADDRESS RANGE = IP ADDRESS : COMMUNITY NAME :
  POLLING INTERVAL : TIME-OUT TIME :" AND
  THE DEFAULT OF THE COMMUNITY NAME IS "public",
  THE DEFAULT OF THE POLLING INTERVAL IS 5 (MINUTES),
  THE DEFAULT OF THE TIME-OUT TIME IS 1 (SECOND).
* THE DEFAULT OF THE TRAP RELAY INTERVAL 450 IS 10 (MINUTES)

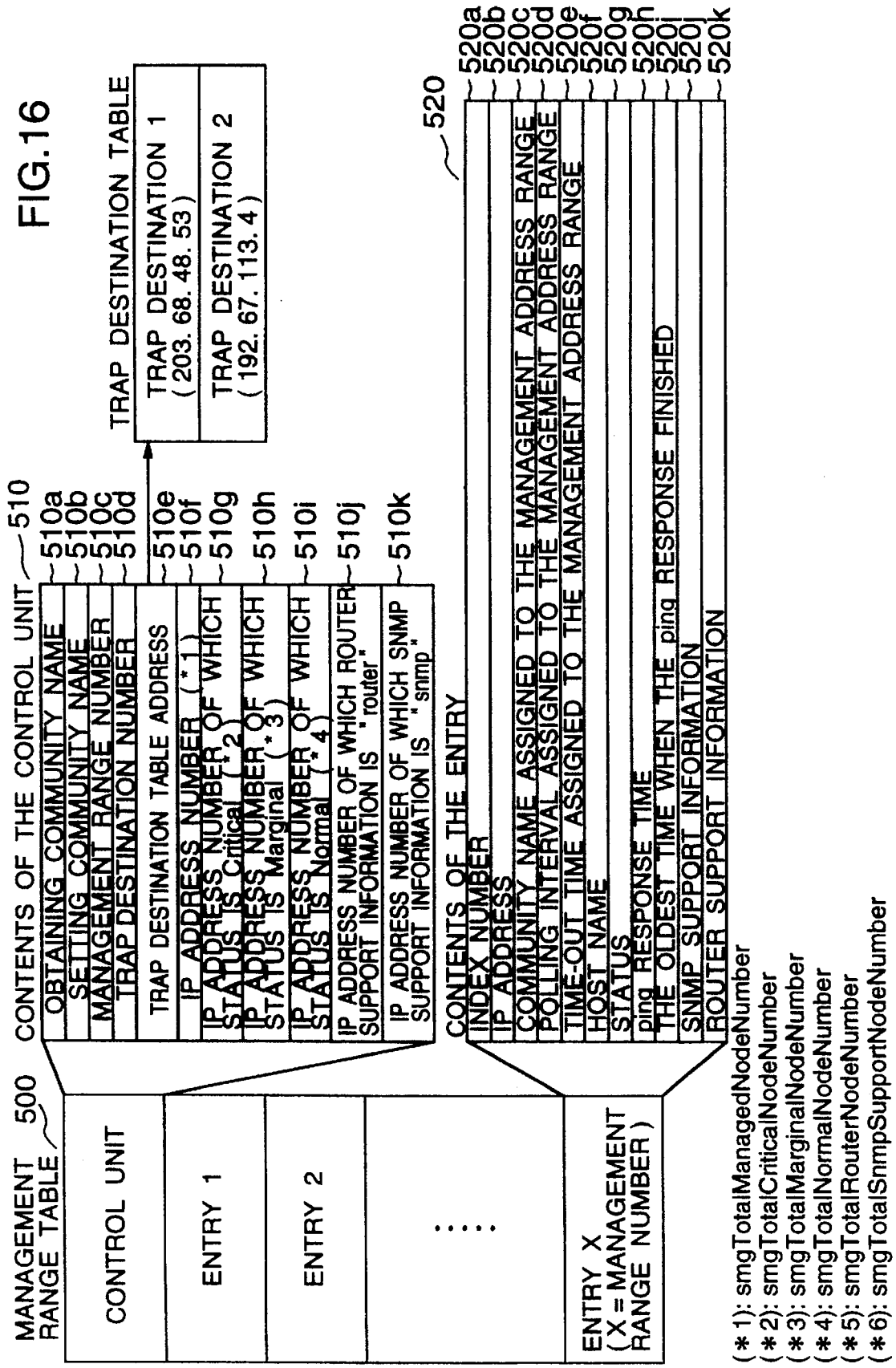

MANAGEMENT RANGE MONITORING SYSTEM (MAIN)

INITIALIZATION OF THE MANAGEMENT RANGE

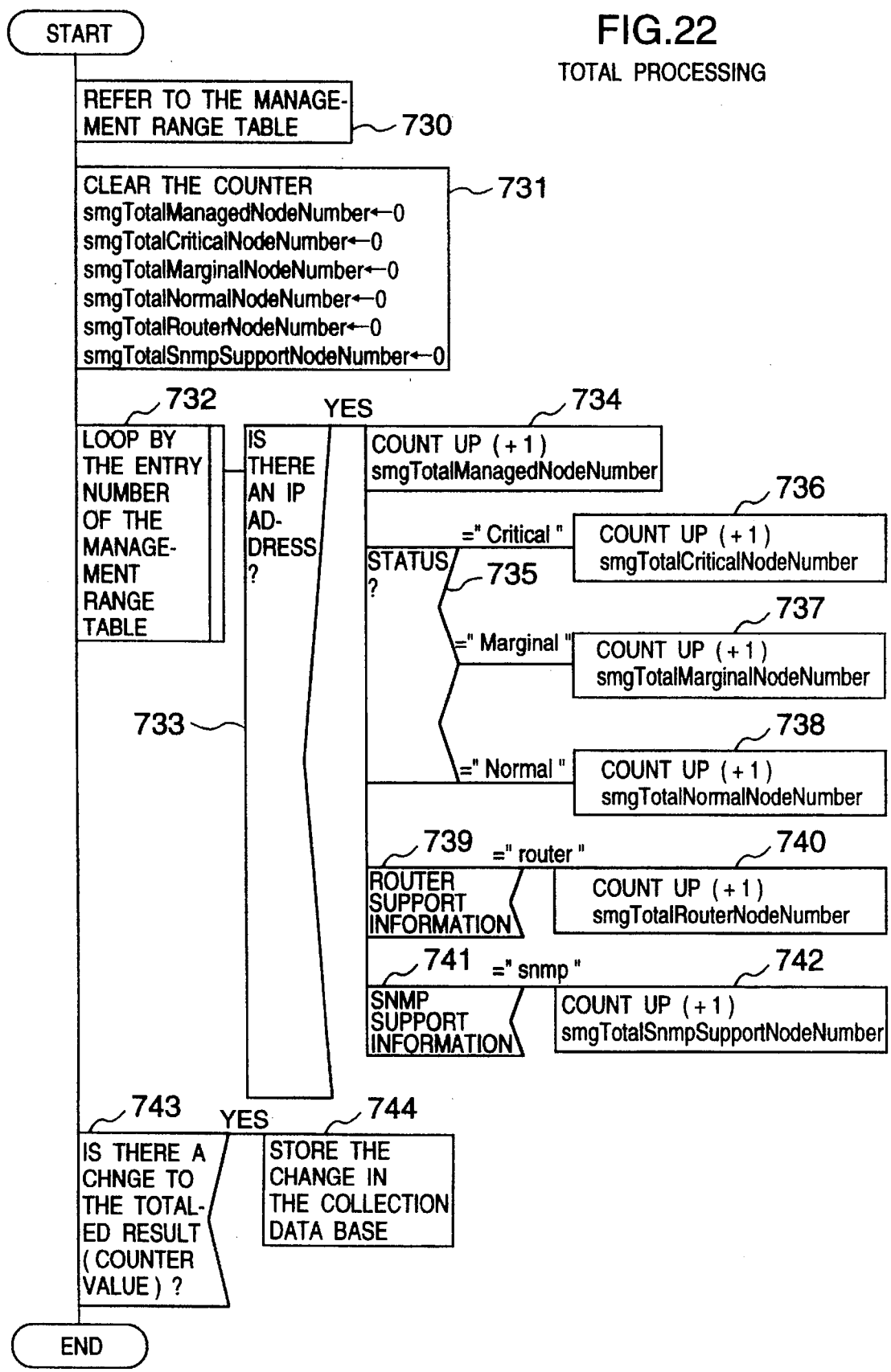
FIG.22 TOTAL PROCESSING

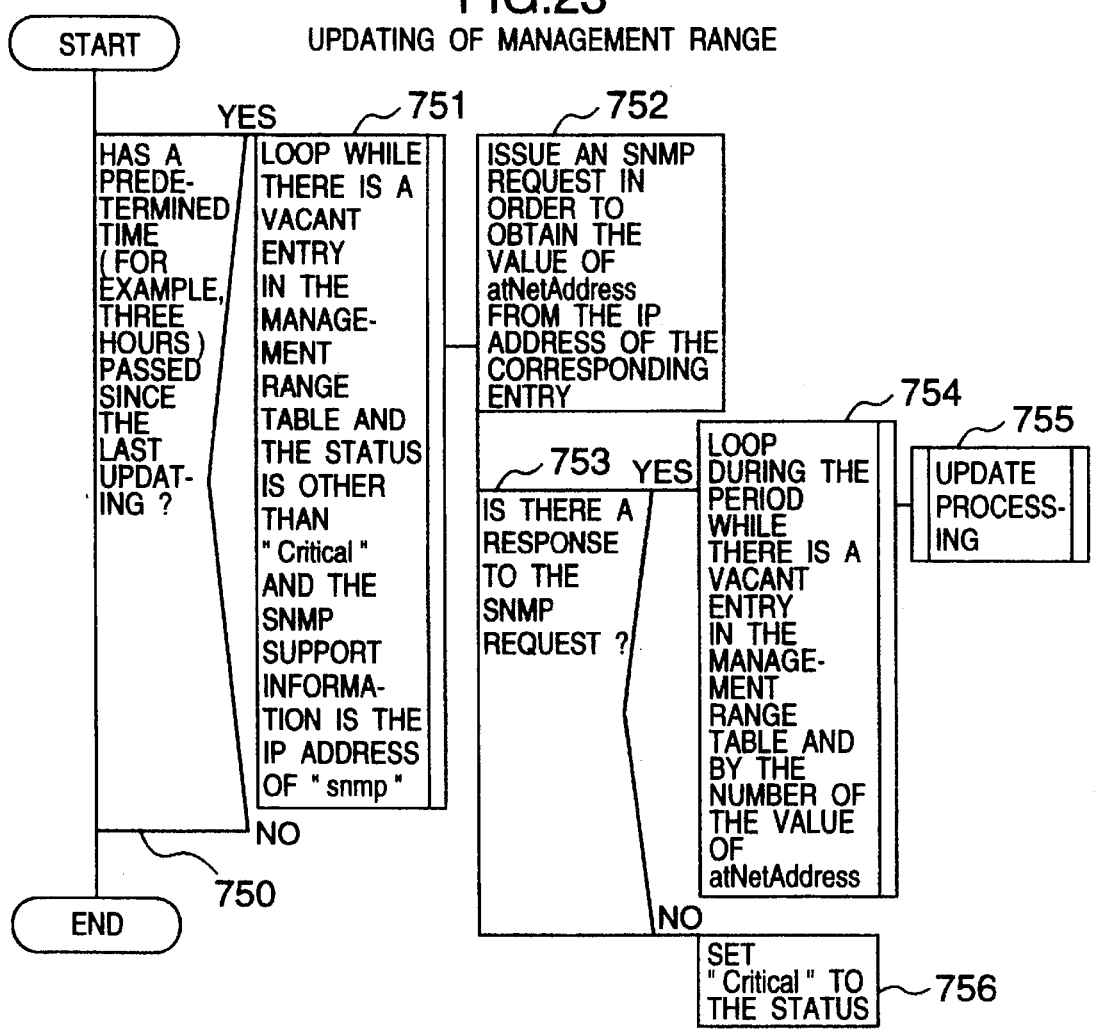
FIG.23 UPDATING OF MANAGEMENT RANGE
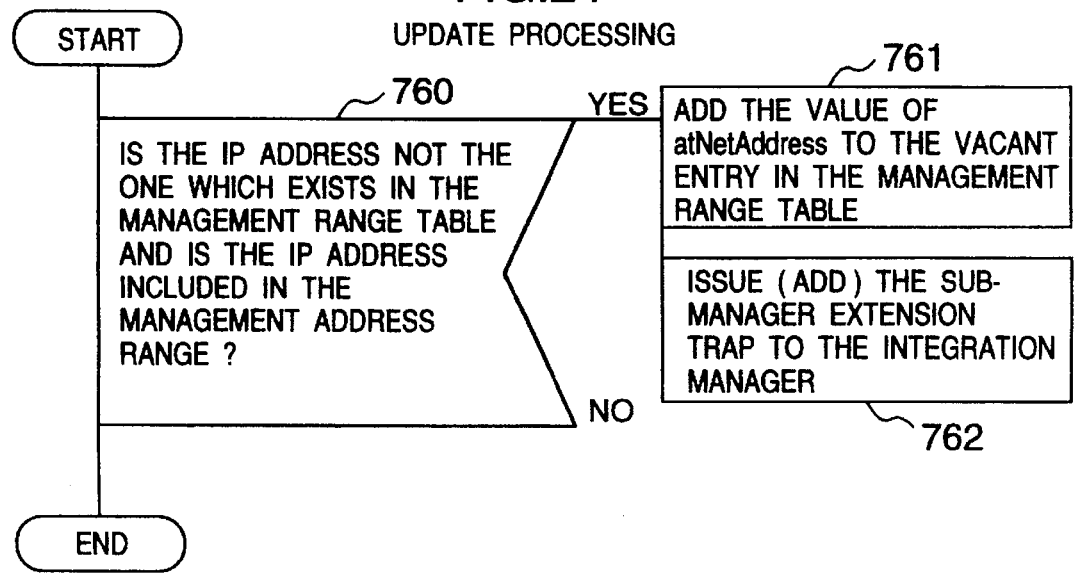
FIG.24 UPDATE PROCESSING

ALLOCATION METHOD
(COMMUNICATION CONTROL FUNCTION)

ALLOCATION METHOD (SUB-MANAGER AGENT FUNCTION)

FIG.29
AN EXAMPLE OF THE GRAPH DISPLAY IN THE INTEGRATION MANAGER OF THE TOTALED VALUE WHICH IS THE COLLECTION MIB
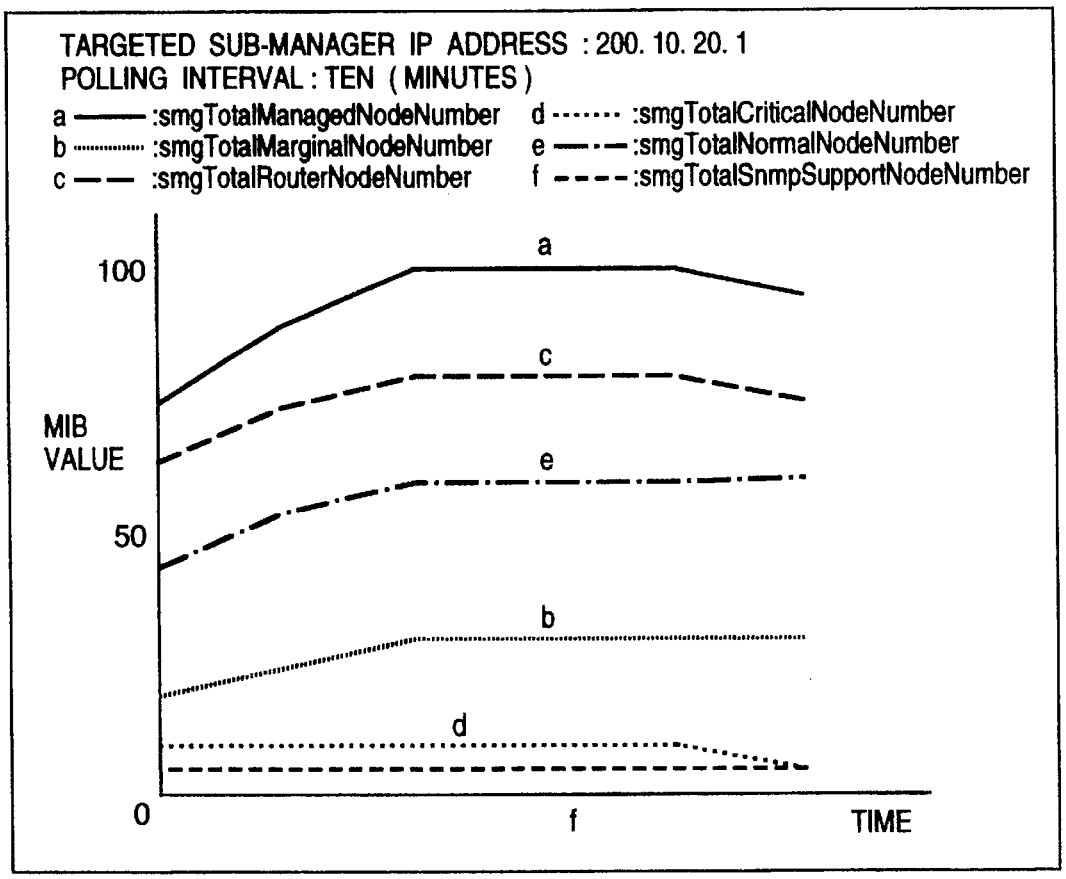
FIG.30 TCP CONNECTION TARGETED BY THE CONCENTRATION FUNCTION
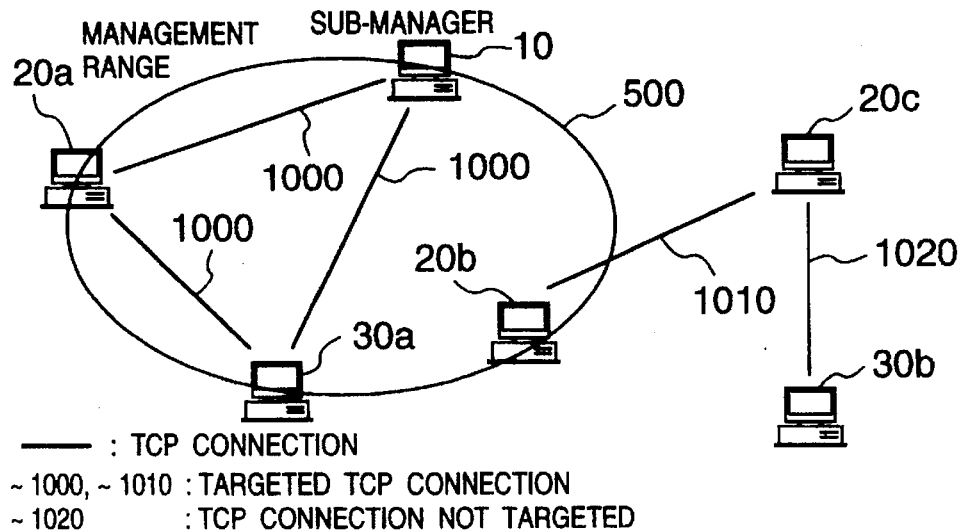

FIG.31

FORMAT OF THE INDEX AND VALUE OF tcpConnState OF THE MIB-II

MANAGEMENT OBJECT IDENTIFIER OF tcpConnState.

| tcp. tcpConnTable. tcpConnEntry. tcpConnState. | LOCAL IP ADDRESS. | LOCAL TCP PORT. | REMOTE IP ADDRESS. | REMOTE TCP PORT. | STATUS | VALUE OF tcpConnState |
|---|---|---|---|---|---|---|
| | | | | | FOR EXAMPLE listen(2) timewait(11) established(5) ... | |

INDEX

FIG.32

INDEX AND FORMAT OF smgSumTcpContext OF THE REAL-TIME COLLECTION MIB

| IP ADDRESS (PART 1) | PORT NUMBER (PART 1) | IP ADDRESS (PART 2) | PORT NUMBER (PART 2) | VALUE |
|---|---|---|---|---|
| smgSumTcpServer -IpAddress | smgSumTcpServer -PortNumber | smgSumTcpClient -IpAddress | smgSumTcpClient -PortNumber | CONTENTS OF smgSumTcpContext |
| 310 | 320 | 340 | 350 | 300 |

INDEX

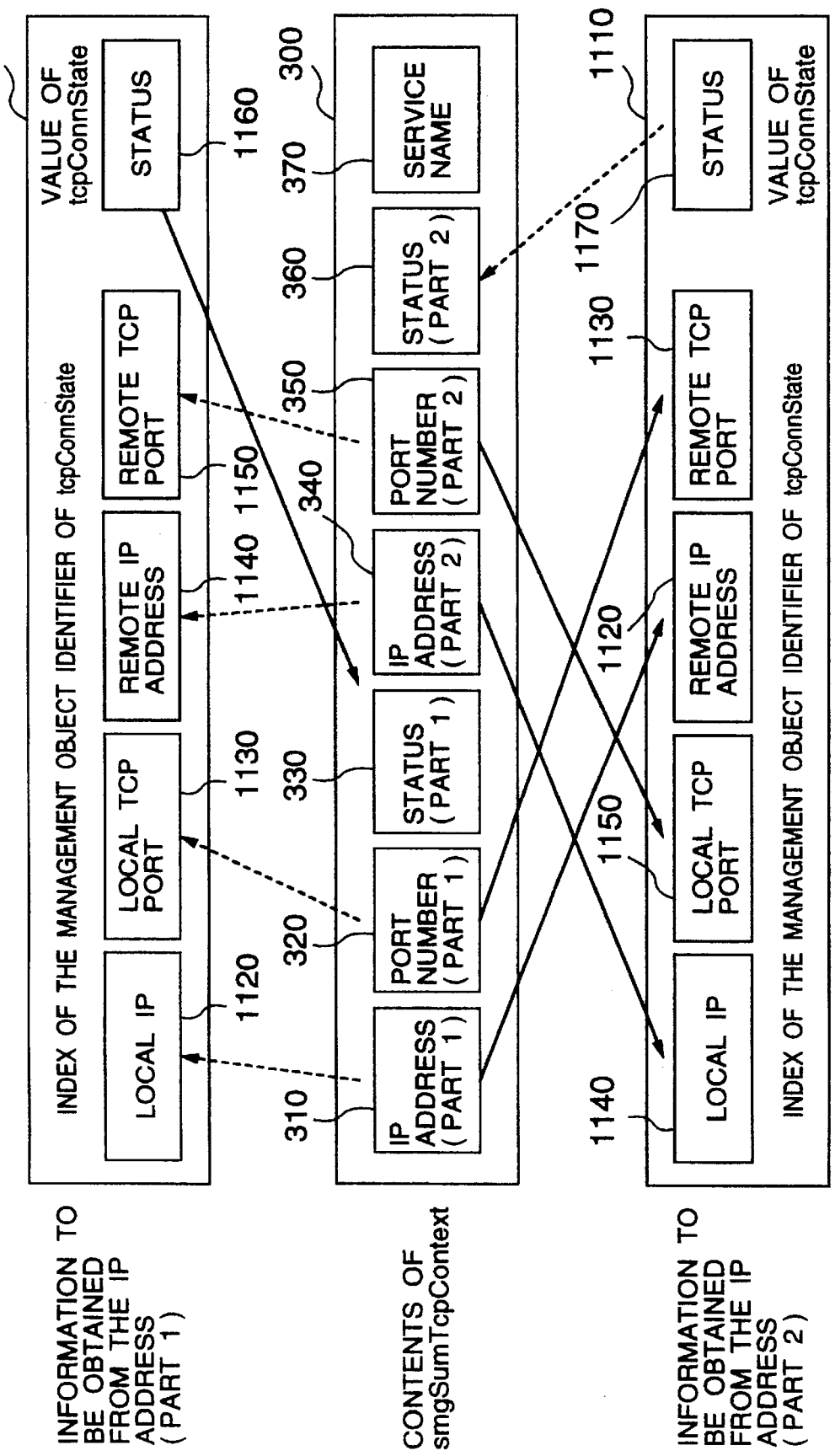

FIG.34

SEQUENCE OF THE INDEX OF THE REAL-TIME COLLECTION MIB

| SEQUENCE OF THE INDEX | CONTENTS OF THE INDEX ||||
|---|---|---|---|---|
| | IP ADDRESS (PART 1) 310 | PORT NUMBER (PART 1) 320 | IP ADDRESS (PART 2) 340 | PORT NUMBER (PART 2) 350 |
| INDEX # 1 ↓ | IP ADDRESS OF THE ENTRY # 1 | SMALL ↓ | IP ADDRESS OF THE ENTRY # 2 | SMALL ↓ |
| | ↓ | | ↓ | |
| | IP ADDRESS OF THE ENTRY # 1 | | IP ADDRESS OF THE ENTRY # 3 | |
| | ↓ | | ↓ | |
| | IP ADDRESS OF THE ENTRY # 1 | | IP ADDRESS OF THE ENTRY # X | |
| | ↓ | | ↓ | |
| | IP ADDRESS OF THE ENTRY # 1 | | IP ADDRESS OF OUTSIDE THE MANAGEMENT RANGE | |
| | ↓ | | ↓ | |
| | IP ADDRESS OF THE ENTRY # 2 | | IP ADDRESS OF THE ENTRY # 3 | |
| | ↓ | ↓ | ↓ | ↓ |
| ↓ | IP ADDRESS OF THE ENTRY # X | LARGE | IP ADDRESS OF OUTSIDE THE MANAGEMENT RANGE | LARGE |

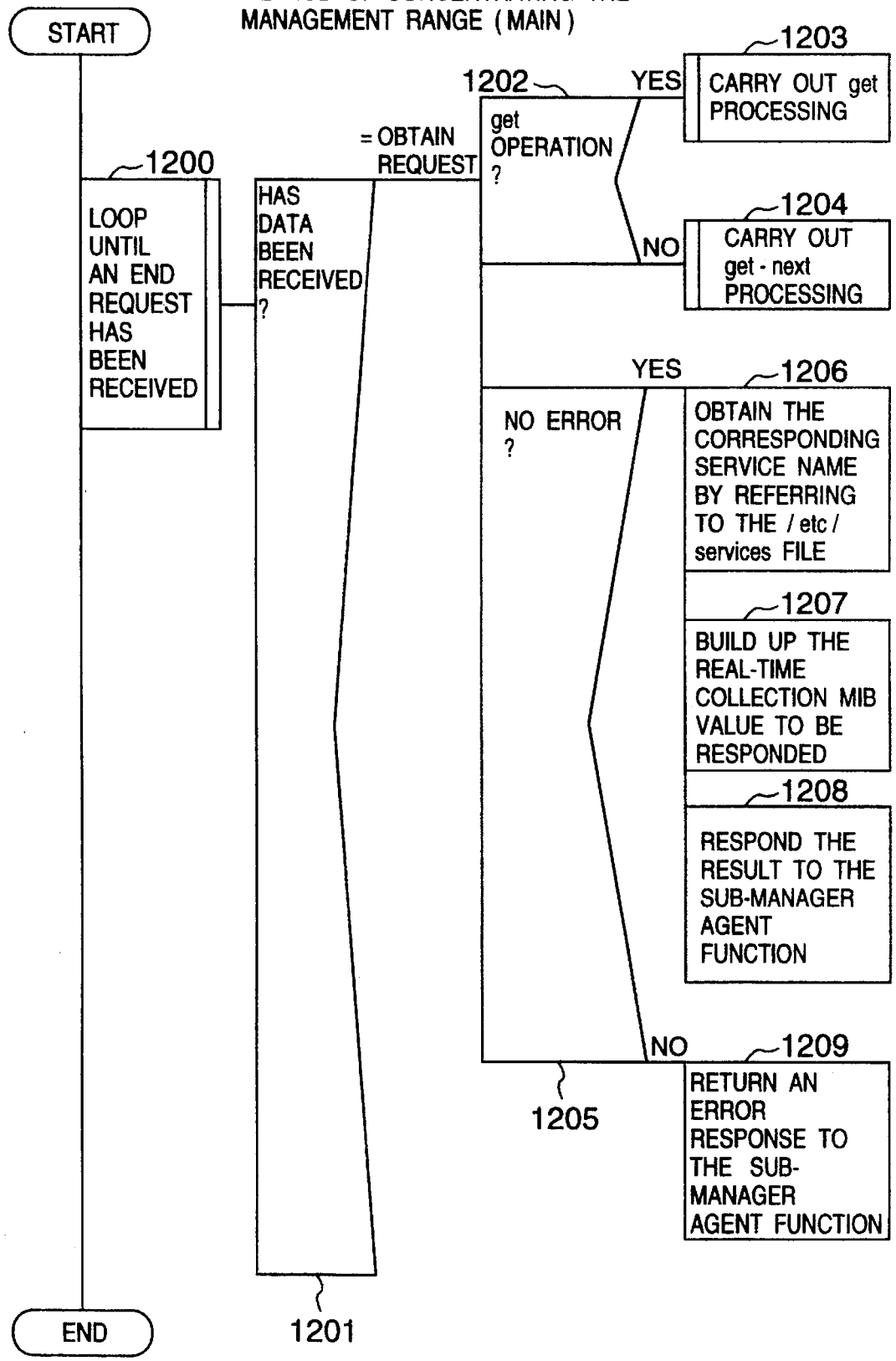

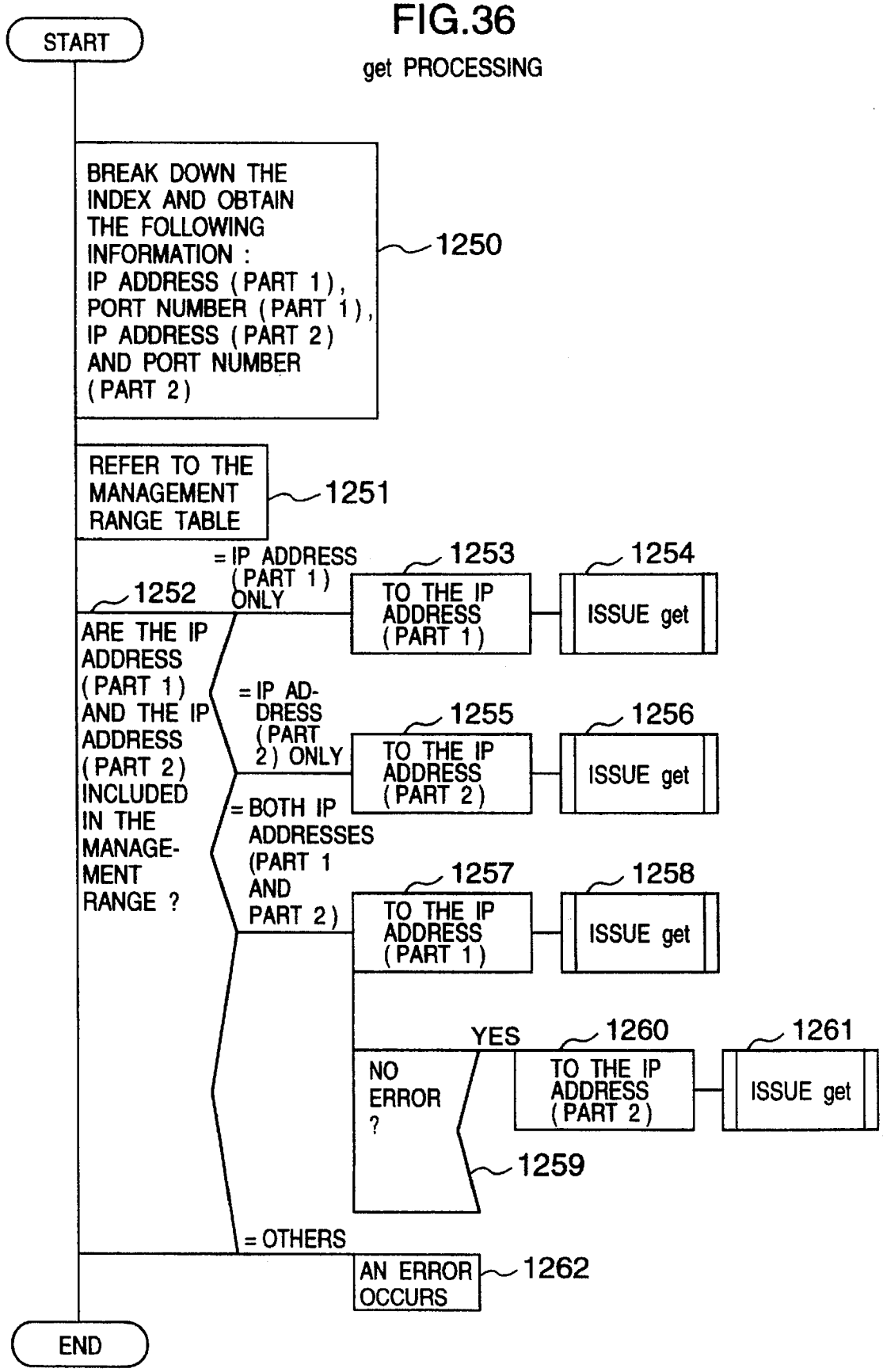

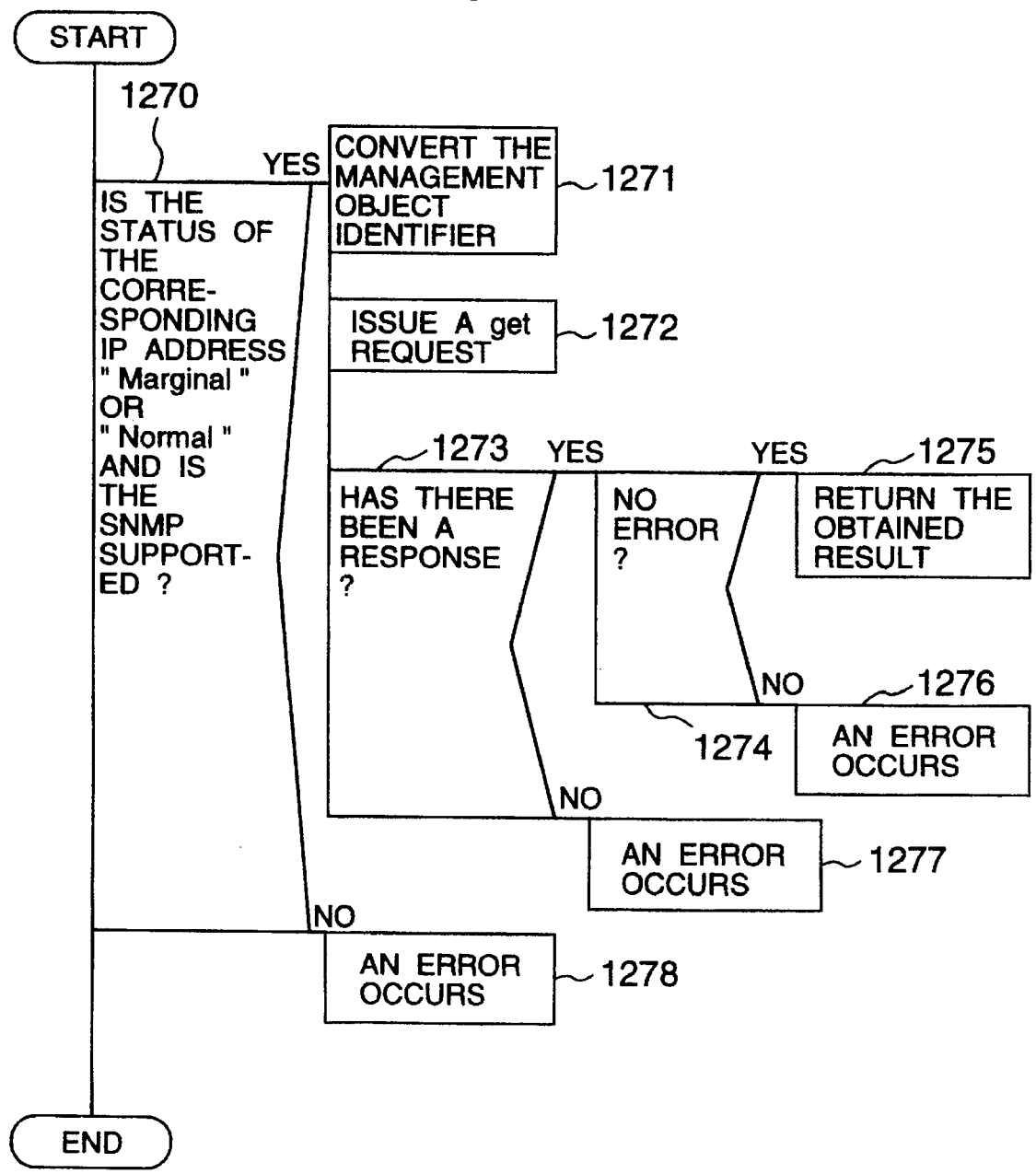

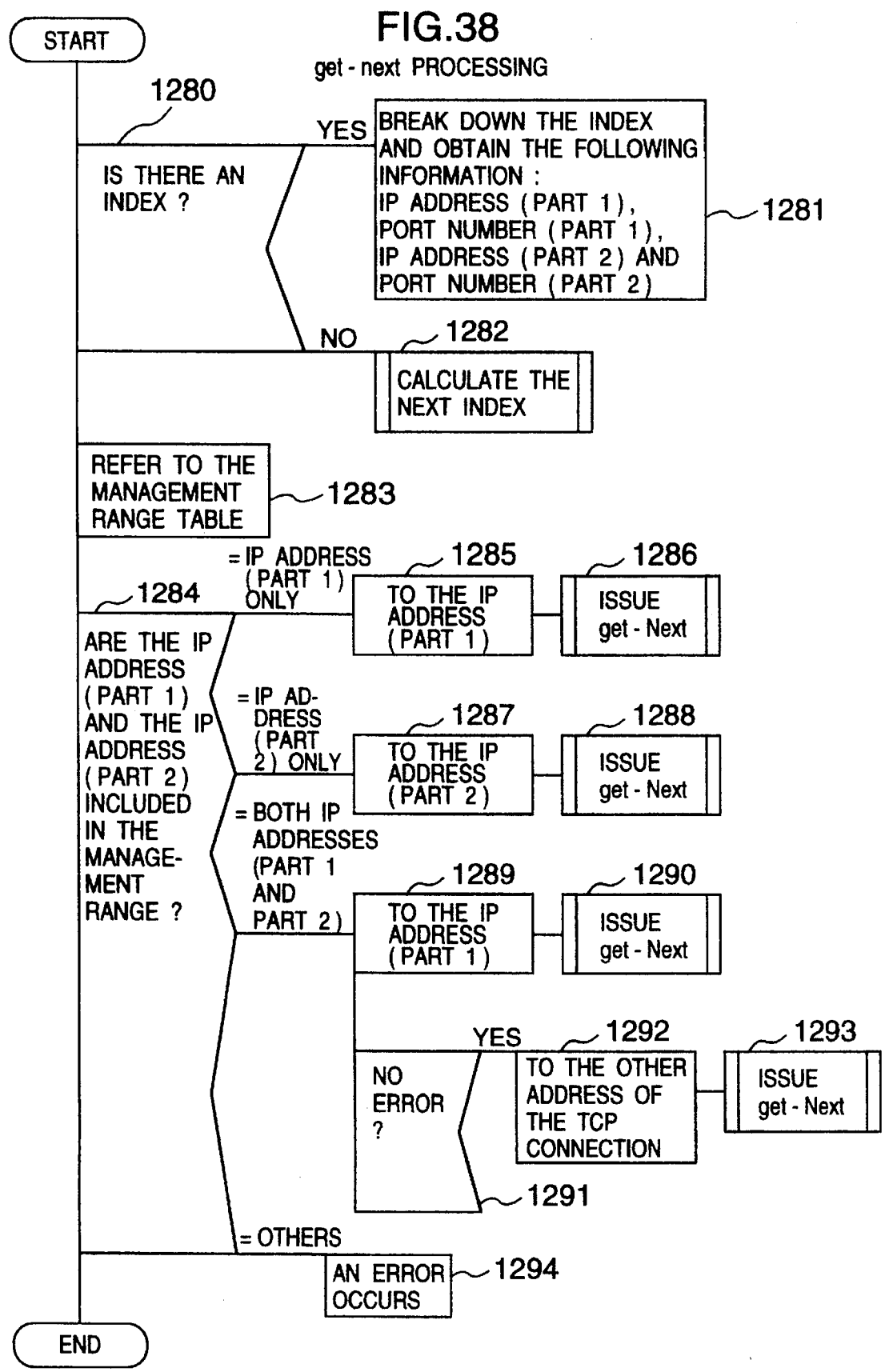

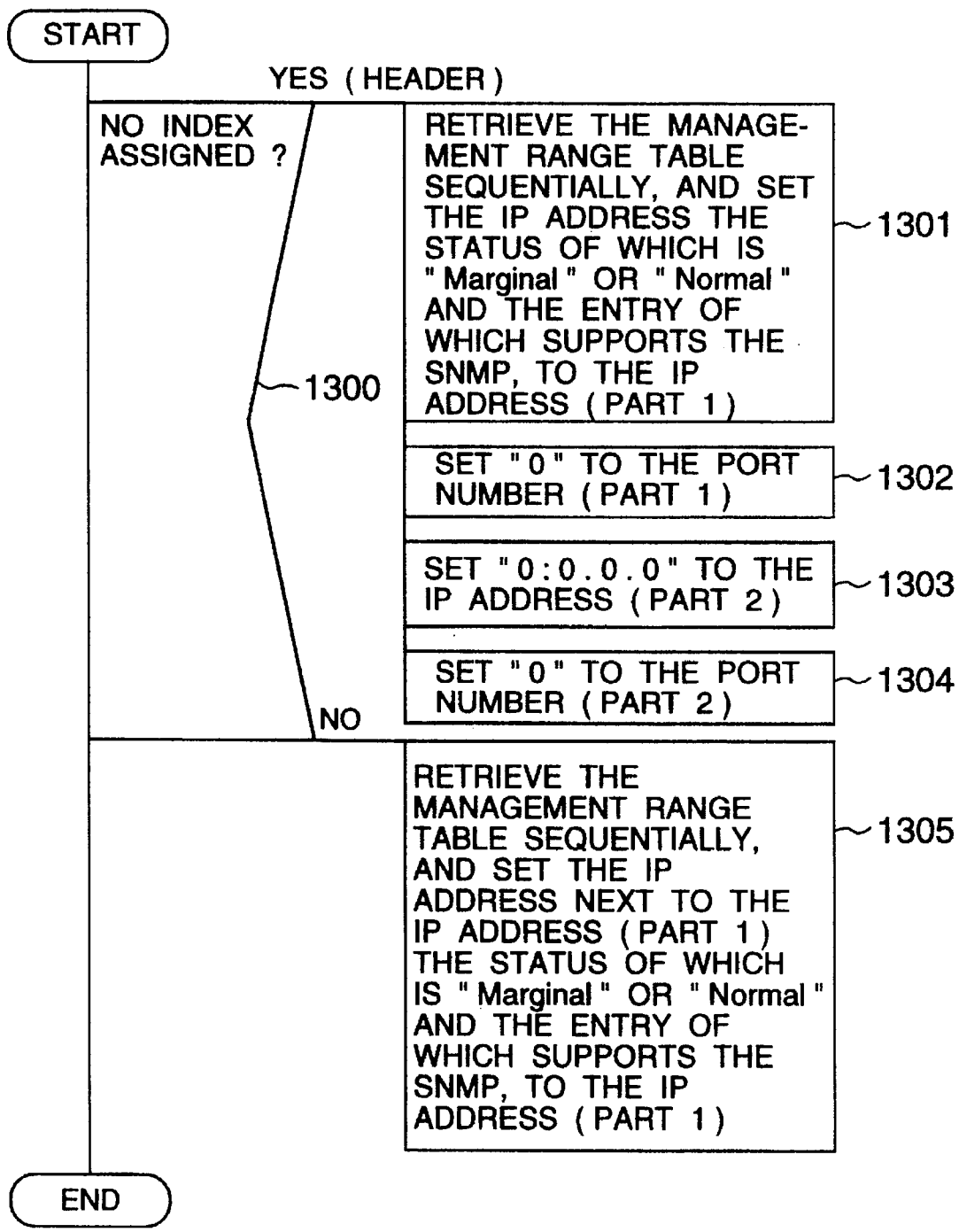

get - next ISSUE

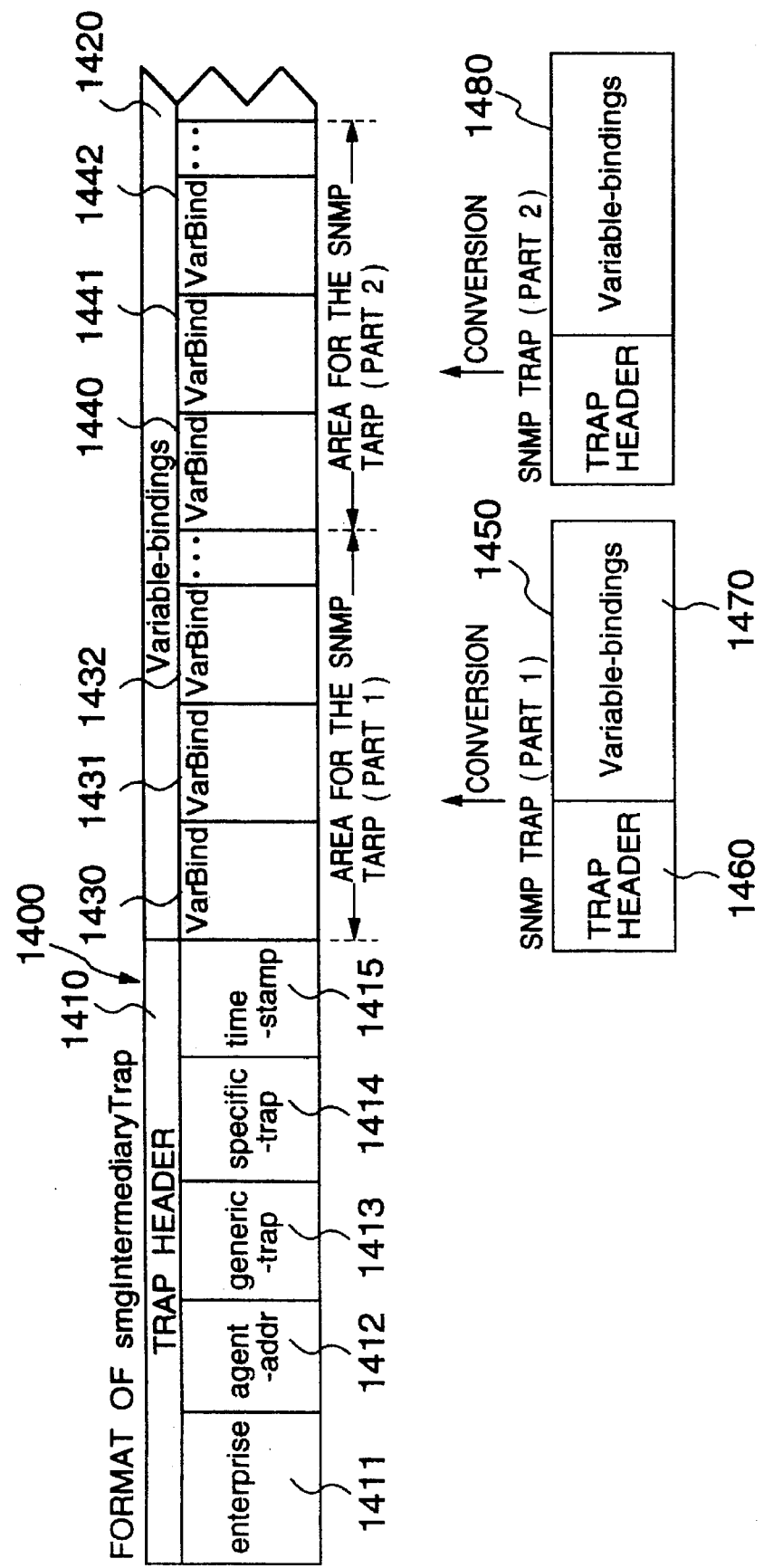
FIG. 41 A CONVERSION DIAGRAM FROM THE SNMP TRAP TO THE SUB-MANAGER EXTENSION TRAP (OUTLINE)

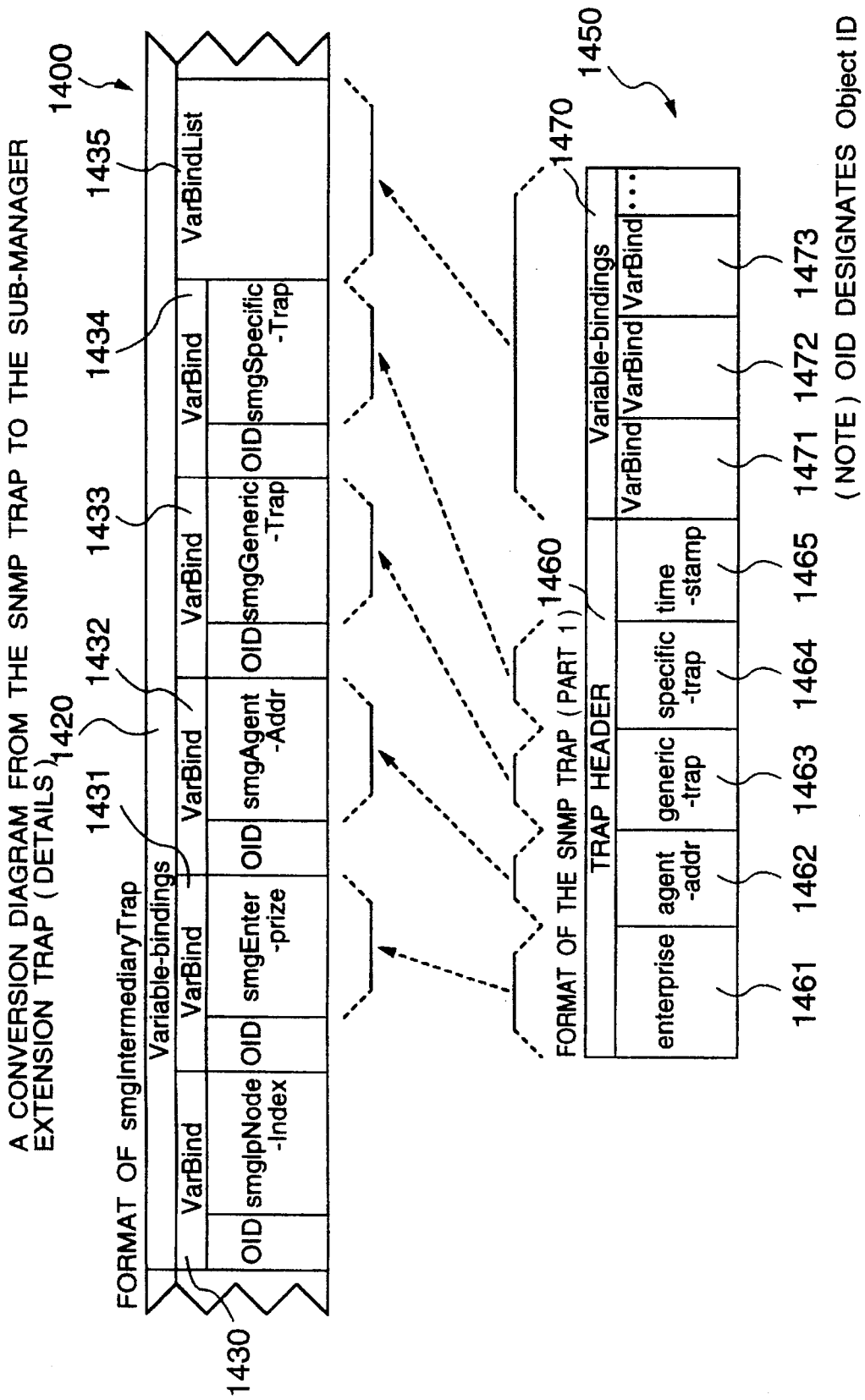
FIG.42 A CONVERSION DIAGRAM FROM THE SNMP TRAP TO THE SUB-MANAGER EXTENSION TRAP (DETAILS)

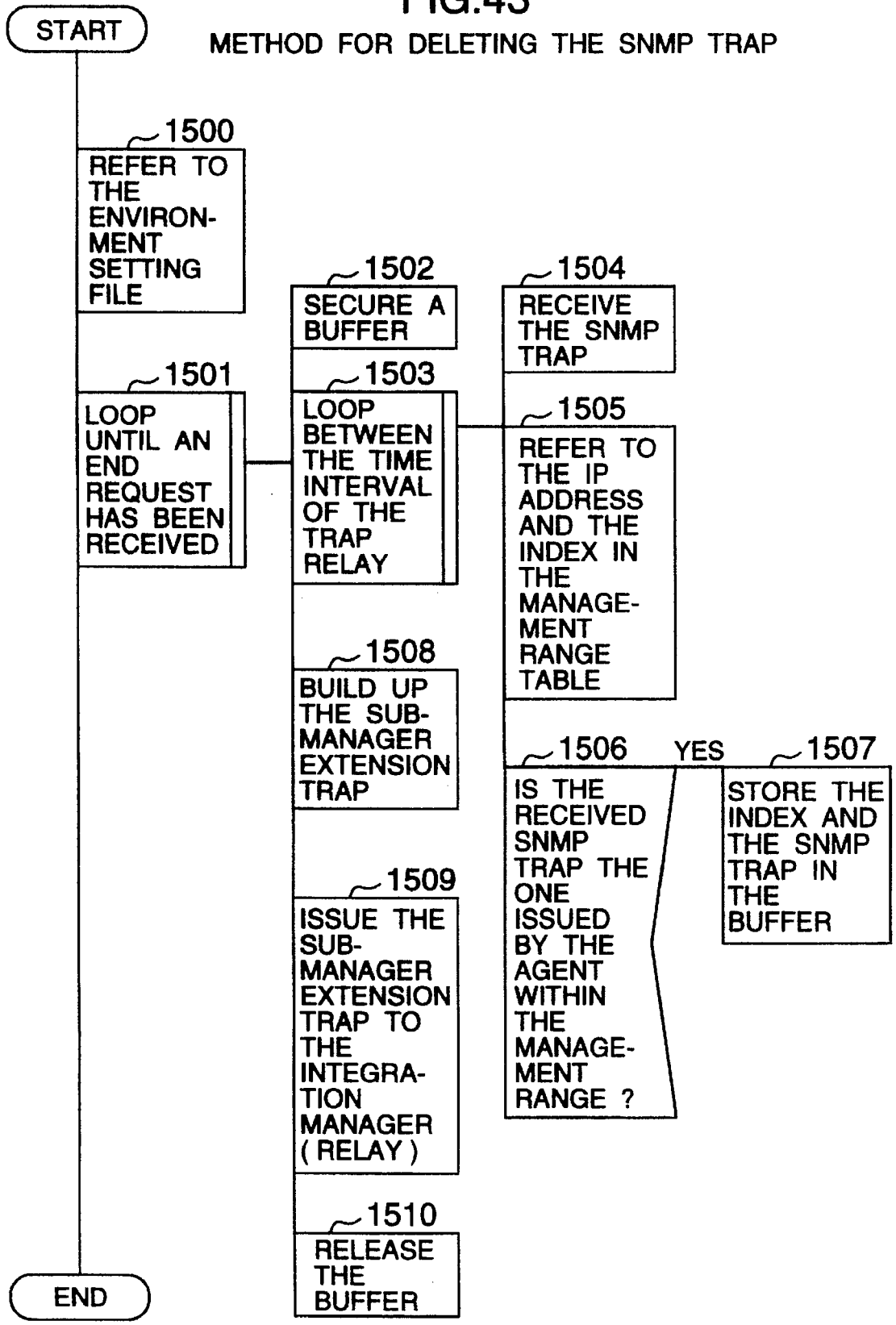
FIG.43 METHOD FOR DELETING THE SNMP TRAP

HIERARCHICAL NETWORK MANAGEMENT SYSTEM

BACKGROUND OF THE INVENTION

The present invention relates to a hierarchical network management system, and relates more particularly to a hierarchical network management system which hierarchically manages network resources by agents, sub-managers and an integration manager and which uses SNMP (Simple Network Management Protocol) as a communication protocol among them.

In general, a management system of a communication network is structured by two types of sub-systems, managers and agents. A manager manages and controls network resources in agent unit. An agent manages and controls management objects such as structure information and status information in resource unit of the communication network.

There exist two international standards relating to management of communication networks, IAB (Internet Activities Board) management standard and OSI (Open Systems Interconnection) management standard. In the networks which use these management standards, their network resources are being managed in the following manner.

(1) Network management systems which use the management standard

When a communication network becomes large scale, the communication network is divided into a plurality of communication networks (hereinafter to be referred to as "sub-networks"), and a manager and agents are provided for each sub-network so that network resources of each sub-network are managed.

In this case, in carrying out resource management based on the IAB management standard, an SNMP (Simple Network Management Protocol) is used. The standard relating to the SNMP is prescribed by RFC 1157, "A Simple Network Management Protocol".

(2) Hierarchical network management system which uses both the OSI management standard and the IAB management standard A sub-manager manages each LAN (Local Area Network) based on the IAB management standard, and the sub-manager and its higher level integration manager manages the network resources based on the OSI management standard, as described in "Integrated OSI Network Management for Distributed LAN Domains", Miyauchi et al., Information Processing Society of Japan, June 1993 issue, pp. 1426–1440, hereinafter to be referred to as "reference literature (1)".

Reference literature (1) proposes to achieve hierarchical network management by combining both the OSI management and the SNMP management. In other words, in this network, the sub-manager manages the network resources according to the IAB management standard, converts this management to management based on the OSI management standard and transfers the converted management to the integration manager. The integration manager then manages all of the resources of the network.

In managing a large-scale network, it is certainly effective to manage the network by a hierarchical structure from the viewpoint of deleting management packet and simplifying the manager.

However, no consideration is given to hierarchical management in the above-described network management system which uses the SNMP of the IAB management standard. Accordingly, even if a sub-manager is provided between the manager and the agents, it is not possible to achieve hierarchical management if the structure of management information to be transmitted between the manager and the sub-manager and the method for focusing the management information are not completed. In other words, one problem is that it is not possible to achieve a hierarchical network management system for managing and controlling a group of agents.

In this case, according to the standard of SNMPv2 (SNMP version 2), it is possible to notice an event from one manager to another manager. However, no consideration is given to hierarchical management in SNMPv2 as is the case with the SNMP. Accordingly, even if a sub-manager is provided between the manager and the agents, it is not possible to achieve the hierarchical management if the structure of management information to be transmitted between the manager and the sub-manager and the method for focusing the management information are not completed.

On the other hand, in the OSI management system described in reference literature (1), the sub-manager should have both communication service of the OSI standard for achieving the OSI management standard and communication service of the IAB standard for achieving the IAB management standard, so that there is a problem that the sub-manager becomes large in scale.

In the LAN, communication service of the IAB standard is used, and it is a normal application of the communication network that communication service of the IAB standard is used between LANs. Accordingly, in the management system described in reference literature (1), it is necessary to use the OSI management standard although the IAB management standard is used in a WAN (Wide Area Network). There is also a problem that the sub-manager is large in structure.

Further, when the integration manager hierarchically manages the communication network, which is managed by a plurality of management standards, by integrating the communication network, it is necessary to give advance consideration to the agency and distribution, etc., for reducing the load of conversion of management information and the load of the integration manager. However, no consideration is given to the agency, decentralization, etc., in management system of the reference literature (1). Therefore, there is a problem that, as the network becomes larger in scale, the number of management packets which are used at the time of exchanging management information between the integration manager and the sub-manager increases.

SUMMARY OF THE INVENTION

It is a first object of the present invention to provide a hierarchical network management system which can hierarchically manage a large-scale communication network by sub-managers of a simple structure based on an SNMP of the IAB management standard.

It is a second object of the present invention to provide a hierarchical network management system which can transmit management information between an integration manager and sub-managers based on a small volume of management packets and which can manage a large-scale communication network with low traffic and at low cost.

In order to achieve the first object, the present invention is characterized in that, basically, an SNMP is used as a communication protocol between an agent and a sub-manager and between a sub-manager and an integration manager, respectively, and that a periodical collecting unit is provided within a sub-manager which periodically collects management objects of a range of self-management through agents which belong to the same management range and which causes a sub-manager to post to the integration manager the collected information at a reference request from the integration manager. In this system, a sub-manager behaves as a manager to its agents and behaves as an agent to the integration manager.

In order to achieve the second object, the present invention is characterized in that a sub-manager concentrates a plurality of information from each agent which is managed by a plurality of identifiers at a reference request from the integration manager and posts the concentrated information to the integration manager by using an SNMP as a communication protocol.

According to the above unit, a periodical collecting unit within a sub-manager periodically collects management objects of a self-management range through agents which belong to the same management range and posts the collected information to the integration manager at a reference request from the integration manager.

In this case, the collected information is held in a format called MIB (Management Information Base) which is a set of a plurality of management objects expressed in a tree structure, is accessed at a reference request from the integration manager and is posted to the integration manager.

With the above-described structure, it is possible to hierarchically manage a large-scale communication network based on a single protocol called an SNMP of the IAB standard and that it is possible to simplify the structure of a sub-manager because of the simple protocol.

A sub-manager concentrates a plurality of management objects from each agent which is managed by a plurality of identifiers and posts the concentrated result to the integration manager. Accordingly, it is possible to transmit management information between the integration manager and a sub-manager with a small volume of management packets and that it is possible to reduce the load of the integration manager. Further, it is possible to manage a large-scale communication network with low traffic and at low cost.

A network manager at the integration manager side can confirm agent structure information and status information of a sub-manager management range by referring to the periodical collection MIB of the sub-manager to meet an application.

Further, when a sub-manager collects management objects in real time and posts the collected management objects to the integration manager, the integration manager can accept the latest status of a sub-manager management range with small resources (CPU power and memory capacity) and with small number of management packets.

Further, when the integration manager manages TCP connection information of sub-manager management range as a real-time collection MIB, there is an effect that it is possible to specify an IP node and service of high traffic within a management range of a sub-manager 10 with small operation of the integration manager.

BRIEF DESCRIPTION OF THE DRAWINGS

FIG. 4 is an explanatory diagram for showing an example of the definition (part 1) of the periodical collection MIB which is a sub-manager extension MIB.

FIG. 5 is an explanatory diagram for showing an example of the definition (part 2) of the periodical collection MIB which is a sub-manager extension MIB.

FIG. 6 is an explanatory diagram for showing an example of the definition (part 3) of the periodical collection MIB which is a sub-manager extension MIB.

FIG. 7 is an explanatory diagram for showing an example of the definition (part 1) of the real-time collection MIB which is a sub-manager extension MIB.

FIG. 8 is an explanatory diagram for showing an example of the definition (part 2) of the real-time collection MIB which is a sub-manager extension MIB.

FIG. 9 is an explanatory diagram for showing an example of the definition (part 3) of the real-time collection MIB which is a sub-manager extension MIB.

FIG. 10 is an explanatory diagram for showing an example of the definition of a sub-manager extension trap.

FIG. 11 is a diagram for showing a correspondence table of management objects for converting from the MIB-II to a sub-manager extension MIB.

FIG. 14 is a diagram for showing a correspondence table of the periodical collection MIB to be totaled.

FIG. 15 is an explanatory diagram for showing an example of the environment setting file.

FIG. 16 is an explanatory diagram for showing an example of the contents of the management range table.

FIG. 22 is an outline PAD diagram of a total processing.

FIG. 23 is an updated outline PAD diagram of a management range.

FIG. 24 is an outline PAD diagram of an updating processing.

FIG. 29 is an explanatory diagram for showing an example of the graph display in the integration manager of a collected value which is the periodical collection MIB.

FIG. 30 is an explanatory diagram for showing an example of the TCP connection to which the concentration function is applied.

FIG. 31 is an explanatory diagram for showing the format of the index and value of tcpConnState of MIB-II.

FIG. 32 is an explanatory diagram for showing the format of the index and value of smgSumTcpContext of the real-time collection MIB.

FIG. 33 is an explanatory diagram of the conversion between the tcpConnState of MIB-II and smgSumTcpContext of the real-time collection MIB.

FIG. 34 is an explanatory diagram for showing a sequence of the index of the real-time collection MIB.

FIG. 35 is an outline PAD diagram of the concentrating method (main) of a management range.

FIG. 36 is an outline PAD diagram of the concentrating method (get processing) of a management range.

FIG. 37 is an outline PAD diagram of the concentrating method (get issuing) of a management range.

FIG. 38 is an outline PAD diagram of the concentrating method (get-next processing) of a management range.

FIG. 39 is an outline PAD diagram of the concentrating method (next index calculation) of a management range.

FIG. 41 is a conversion diagram for converting an SNMP trap to a sub-manger extension trap.

FIG. 42 is a conversion diagram for converting an SNMP trap to a sub-manger extension trap.

FIG. 43 is an outline PAD diagram of the deleting system of an SNMP trap.

DESCRIPTION OF THE PREFERRED EMBODIMENTS

One embodiment of the present invention will be explained in detail with reference to the drawings.

Figure 1:
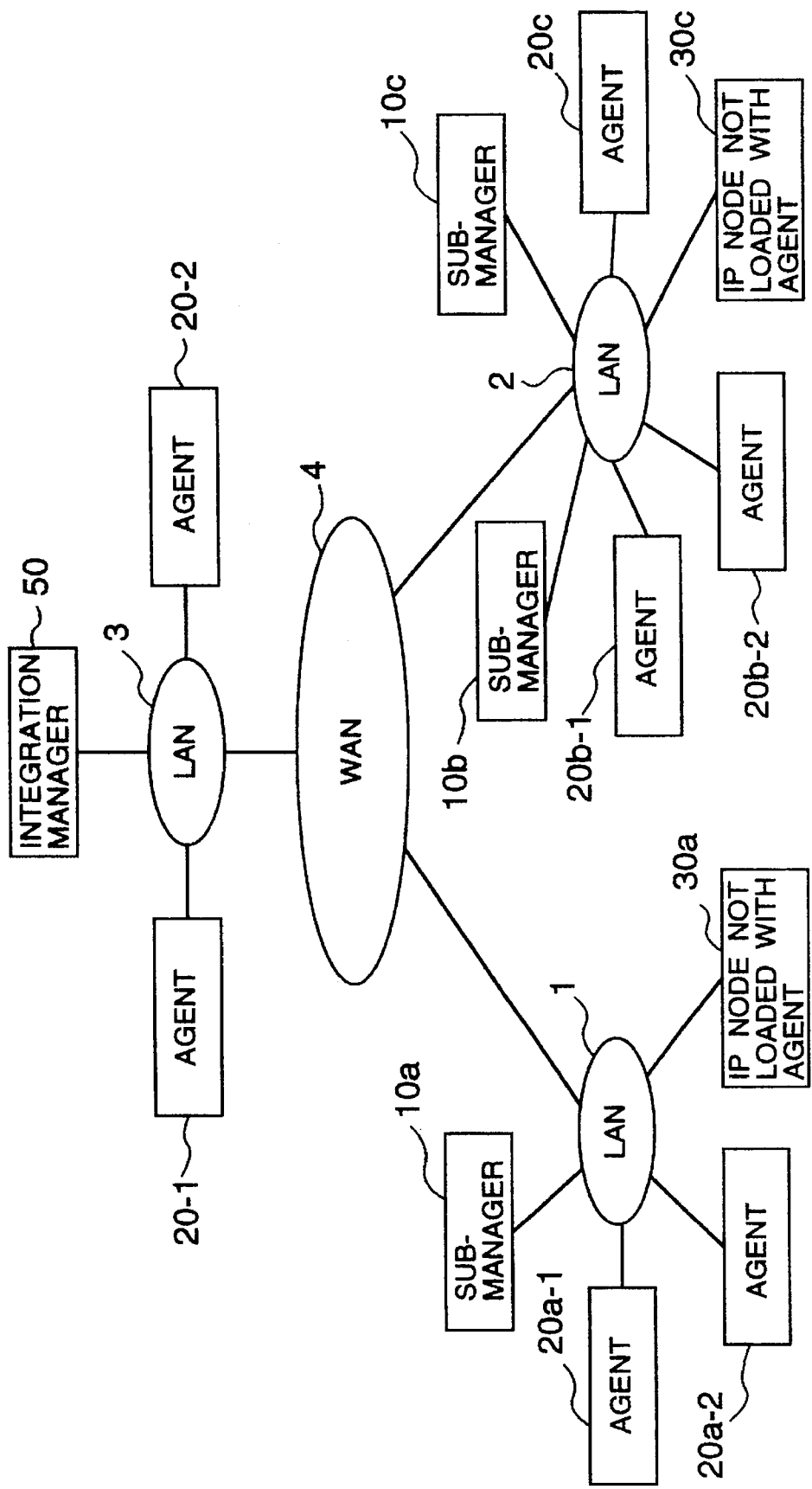
FIG. 1 is a system structure diagram for showing one embodiment of the communication network management system in which an integration manager, sub-managers and agents are arranged.

FIG. 1 is a system structure diagram for showing one embodiment of the communication network to which the present invention is applied. A plurality of LANs 1, 2 and 3 are connected by a WAN (Wide Area Network) 4.

Among these LANs, to the LAN1, a plurality of agents 20a-1 and 20a-2 for managing and controlling management objects such as structure information and status information in network resource unit and an agent-unloaded IP (Internet Protocol) node 30a are connected. Further, through the agents 20a-1 and 20a-2, a sub-manager 10a for managing and controlling the management objects within the LAN1 is connected.

To the LAN2, a plurality of agents 20b-1 and 20b-2 for managing and controlling management objects such as structure information and status information in network resource unit are connected. Further, a sub-manager 10b for managing and controlling the management objects under the management of the agents 20b-1 and 20b-2 is connected to the LAN2. Further, an agent 20c and an agent-unloaded IP node 30a are connected to the LAN2 and a sub-manager 10c for managing and controlling the management objects under the management of the agent 20c is also connected to the LAN2.

In other words, in the LAN2, the management objects are managed by the two sub-managers 10b and 10c.

On the other hand, to the LAN3, a plurality of agents 20-1 and 20-2 are connected. Further, an integration manager 50 for managing and controlling the management objects under the management of the agents 20-1 and 20-2 and for managing and controlling the management objects under the management of the WAN4 and the sub-managers 10a, 10b and 10c through the WAN4 and the sub-managers 10a, 10b and 10c is connected to the LAN3. In other words, the integration manager 50 for hierarchically managing all of the resources of the network is connected to the LAN3.

Figure 2:
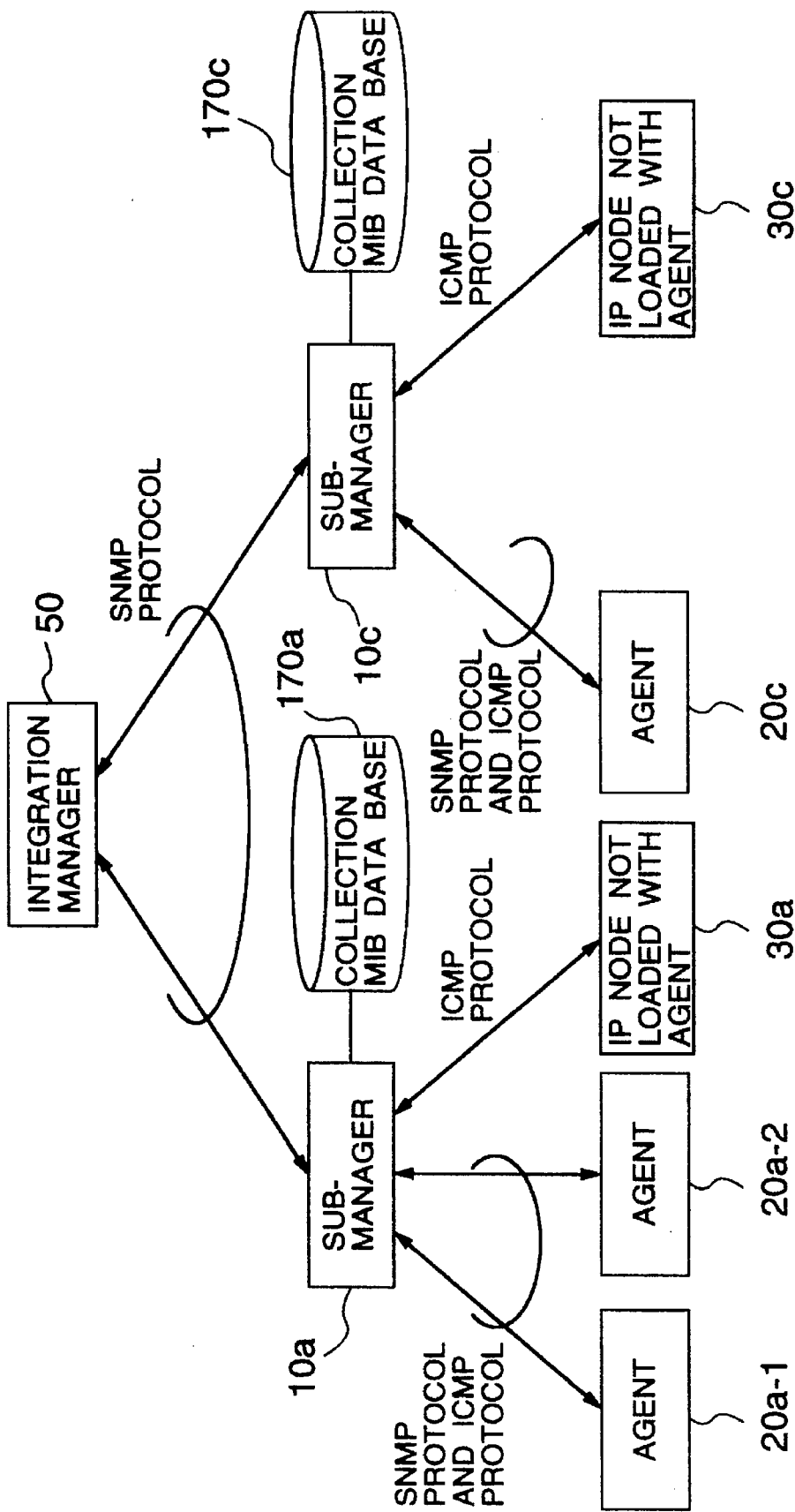
FIG. 2 is a logical relation diagram for showing a logical relationship between the integration manager, sub-managers and agents shown in FIG. 1.

FIG. 2 is a diagram for showing the logical relationship of the agents, the sub-managers and the integration manager. Between the sub-manager 10a connected to the LAN1 and the agents 20a-1 and 20a-2, the management objects are managed by using the SNMP of the IAB management standard and ICMP (Internet Control Message Protocol). Between the sub-manager 10a and the agent-unloaded IP node 30a, the management objects are managed by using the ICMP. To the sub-manager 10a, a collection MIB data base 170a for holding a set of a plurality of management objects that have been collected through the agents of the management range in a format called the MIB, (Management Information Base) which is expressed in a tree structure, is connected.

Similarly, between the sub-manager 10c connected to the LAN2 and the agent 20c, the management objects are managed by using the SNMP of the IAB management standard and the ICMP. Between the sub-manager 10c and the agent-unloaded IP node 30c, the management objects are managed by using the ICMP. To the sub-manager 10c, a collection MIB data base 170c for holding a set of a plurality of management objects that have been collected through the agents of the management range in a format called the MIB (Management Information Base), (hereinafter to be referred to as "the MIB format") which is expressed in a tree structure, is connected.

The sub-manager 10b and the agents 20b-1 and 20b-2 are connected to the integration manager 50 in a similar logical relationship.

Figure 3:
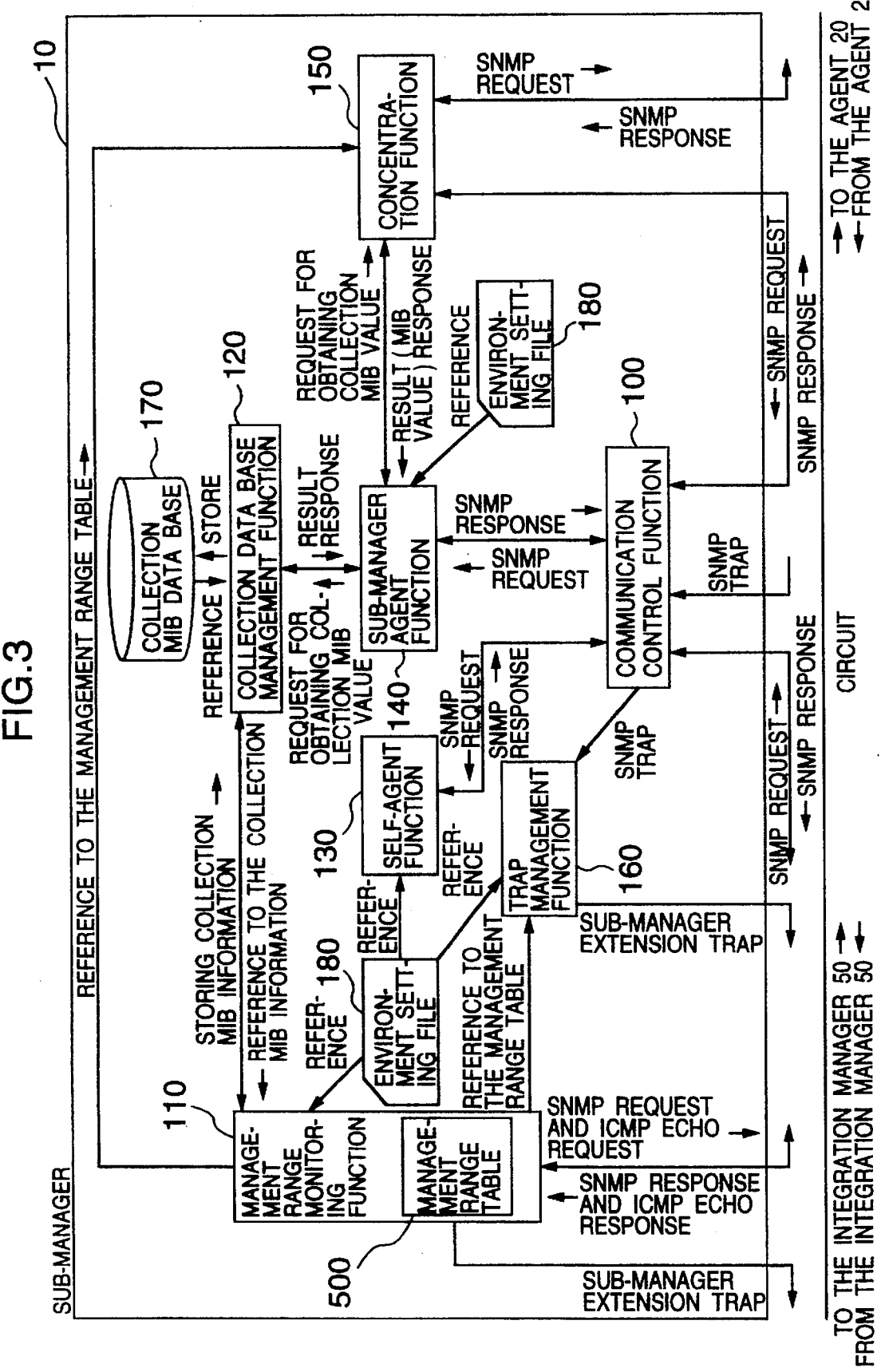
FIG. 3 is a functional structure diagram for showing a detailed structure of a sub-manager which is a key element of the present invention.

FIG. 3 is a functional block diagram for showing one embodiment of the internal structure of the sub-manager 10, which is structured by the following functional module:

(1) communication control function 100
(2) management range monitoring function 110
(3) collection data base management function 120
(4) self-agent function 130
(5) sub-manager agent function 140
(6) concentration function 150
(7) trap management function 160

Details of each function are as described below.

(1) communication control function 100

Under the IAB management standard, the protocol for network management is called SNMP. This standard is prescribed by the RFC 1157, "A Simple Network Management Protocol".

The corresponding communication control unit 100 receives an SNMP request from the integration manager 50 and the sub-manager 10 itself to the corresponding sub-manager and an SNMP trap.

The SNMP request is a request from the integration manager 50 to the sub-manager for obtaining management objects, and a request from the sub-manager 10 to the agent 20 for obtaining management objects.

An SNMP request that has been received within the communication control unit 100 is posted to the self-agent function 130 or to the sub-manager agent function 140 according to the management object identifier which exists within the protocol, and the result of the requested work done is responded to the integration manager 50 or to the sub-manager 10 itself which are the SNMP requesters. A received SNMP trap is posted to the trap management function 160.

(2) management range monitoring function 110

By referring to the environment setting file 180 assigned by the network manger of the sub-manager 10, the management range monitoring function 110 obtains the range of the IP address which has been assigned as the management range of the sub-manager 10. The management range monitoring function 110 periodically issues an SNMP request and an ICMP echo request for obtaining a specified management object defined by the MIB-II, to a specified IP address group (regardless of whether an agent is loaded or not), and obtains an SNMP response and an ICMP echo response which are the result of the requests.

In this case, a polling interval of the SNMP request and the ISMP echo request to be periodically issued and a community name to be described on the SNMP protocol are obtained by referring to the environment setting file 180.

The management range monitoring function 110 produces information of the MIB format from the result periodically obtained, stores the information of the latest MIB format in the memory, delivers this information to the collection data base management function 120 and makes the collection data base management function 120 to store the delivered information in the collection MIB data base 170.

The management range monitoring function 110 also enables the concentration function 150 to refer to the information regarding the IP address and status of the management range and information of whether an agent is loaded or not.

Further, the management range monitoring function 110 enables the trap management function 160 to refer to the information regarding the IP address of the management range and index numbers.

When there has been a change to the information which structures a value of the collection MIB such as an addition or a deletion of the IP node of the management range, the management range monitoring function 110 issues a sub-manager extension trap for posting the change of the information to the integration manager 50.

The standard of the MIB-II is prescribed in RFC 1213, "Management Information Base for Network Management of TCP/IP Based Internets: MIB-II".

(3) collection data base management function 120

When information which constitutes a value of the collection MIB has been inputted from the management range monitoring function 110, the collection data base management function 120 stores this information in the collection MIB data base 170. When a request for obtaining the collection MIB value has been inputted from the sub-manager agent function 140, the collection data base management function 120 builds each information that structures the value of the collection MIB into a management object format and responds the collection MIB value to the sub-manager agent function 140.

(4) self-agent function 130

The self-agent function 130 manages the host in which the sub-manager 10 exists. An SNMP request to the MIB-II and the agent extension MIB from the integration manager 50 and the sub-manger 10 itself is inputted to the self-agent function 130 from the communication control function 100, and the self-agent function 130 outputs the requested SNMP to the communication control function 100.

The environment setting file 180 refers to the self-agent function 130 for a community name (a password for deciding whether to make a response to an SNMP request or not).

(5) sub-manager agent function 140

An SNMP request to the sub-manager extension MIB from the integration manager 50 is inputted from the communication control function 100, and the sub-manager agent function 140 allocates the destination from which the requested SNMP is to be obtained based on the management object identifier described in the protocol of the SNMP request.

To be more specific, according to the present invention, in order to provide to the integration manager 50 the management information that has been collected or concentrated by the sub-manager 10, the sub-manager extension MIB which includes the collection MIB and the real-time collection MIB is defined.

The periodical collection MIB is the MIB of the management information which has been periodically collected by the sub-manager 10 from the IP node group of the management range.

The real-time collection MIB is the concentration in the MIB format of the management object information which has been prepared by the sub-manager 10 for the sub-manager to respond to the integration manager 50, by real-time collecting and concentrating (deleting or processing unnecessary information) the management object information of the management range at the reference request of the integration manager 50.

In the case of a reference request to the periodical collection MIB, the sub-manager agent function 140 requests the collection data base management function 120 to obtain the MIB value and the sub-manager agent function 120 obtains the result from the collection MIB data base 170.

In the case of a reference request to the real-time collection MIB, the sub-manager agent function 140 requests the concentration function 150 to obtain the MIB value, and obtains the result from the concentration function 150.

The sub-manager agent function 140 outputs the obtained result to the communication control function 100.

The environment setting file 180 refers to a community name (a password for deciding whether to respond to an SNMP request or not) in the sub-manager agent function 140.

(6) concentration function 150

When a request for obtaining the real-time collection MIB value has been inputted from the sub-manager agent function 140 to the concentration function 150, the concentration function 150 issues an SNMP request to the IP node group which is loaded with an agent of the management range. After a response to the request has been received, the concentration function 150 carries out a concentration processing and returns the concentrated MIB value to the sub-manager agent function 140.

The environment setting file 180 refers to a community name described in the protocol at the time of issuing the SNMP request.

(7) trap management function 160

When the SNMP trap is posted to the trap management function 160 from the communication control function 100, the trap management function 160 summarizes a plurality of SNMP traps posted within a predetermined time as one sub-manager extension trap and relays the sub-manager extension trap to the integration manager 50.

The environment setting file 180 refers to a time interval for issuing the sub-manger extension trap and a community name and others described in the protocol, in the trap management function 160.

The logical structure of the sub-manager extension MIB which is the main element of the present invention, the method of determining and the method of monitoring the management range of the sub-manager, the method of allocating an SNMP request that has been received by the sub-manager, the method of managing the collection MIB, the method of concentrating the collection MIB and the method of managing the SNMP trap will be explained in detail.

(1) logical structure of the sub-manager extension MIB

According to the IAB management standard, the logical structure of the management object is usually defined by a virtual data base called a management information base. This management information base is called MIB.

A syntax for describing the MIB and a method for identifying the instance of a management object are prescribed in RFC 1155, "Structure and Identification of Management Information for TCP/IP-based Internets" and RFC 1212, "Concise MIB Definitions".

The standard agent 20 is loaded with a management object which is prescribed in the MIB-II.

The sub-manager 10 issues an SNMP request and an ICMP echo request for obtaining a value of a specified MIB-II from the IP node group of the management range, and obtains a value of the sub-manager extension MIB from a result of collection of the response to the requests.

The sub-manager extension MIB is structured by the periodical collection MIB and the real-time collection MIB.

The periodical collection MIB is the MIB which is prepared from the management information that has been periodically collected by the sub-manger 10 from the IP node group of the management range. This data base is structured by table type management object identifiers consisting of a plurality of entries and non-table type management object identifiers.

A table-type management object identifier has an entry in IP node unit of the management range, and structure information (IP address, host name, presence or absence of the loading of an agent, identification flag of the IP router, etc.) of the management range and status information such as the IP status, response time of the ping (ICMP echo request packet), etc. are held in each entry.

When a reference request has been received from the integration manager 50, a method is used for reducing the number of management object identifiers to be returned, by putting the entry consisting of a plurality of information into an information unit which includes an index portion and a context portion.

A non-table type management object identifier expresses the information of the contents of each of the structure information and status information of the table type management object, totaled by the number of the IP nodes.

A unit for totaling information for giving the total information to the integration manager 50 is provided in the sub-manager 10.

On the other hand, the real-time collection MIB is the concentration in the MIB format of the management information which has been prepared by the sub-manager 10 for the sub-manager to respond to the integration manager 50, by real-time collecting and concentrating (deleting or processing unnecessary information) the management information of the management range at the reference request of the integration manager 50.

The sub-manager 10 receives an SNMP request from the integration manager 50 and from the sub-manager itself. This is because the sub-manager itself can be included in the management range of the sub-manager 10. Particularly, when the sub-manager 10 has received a reference request of the real-time collection MIB from the integration manager 50, the sub-manager 10 issues an SNMP request to the sub-manager itself, and responds the result of the SNMP after concentration. Therefore, the sub-manager 10 is structured to be able to carry out parallel processing of a plurality of SNMP requests.

Examples of the definition of the periodical collection MIB which is the sub-manager extension MIB are shown in FIGS. 4 to 6, examples of the definition of the real-time collection MIB are shown in FIGS. 7 to 9, and an example of the sub-manager extension trap is shown in FIG. 10.

In the definition examples of the periodical collection MIB in FIGS. 4 to 6, the following definition examples are shown:

(1) number of IP nodes to be managed
(2) number of nodes which are in critical situation with the sub-manager
(3) number of nodes which can communicate with the sub-manager but in which there exists a TCP/IP interface that is not operating
(4) number of nodes in which all the TCP/IP interfaces are operating
(5) number of routers which are within the management range of the sub-manager
(6) number of nodes which are loaded with SNMP within the management range of the sub-manager
(7) a list of information relating to the IP node of the management range of the sub-manager
(8) entry which includes information for each IP of the management range In the definition examples of the real-time collection MIB in FIGS. 7 to 9, the following definition examples are shown:

(1) a list of the TCP connection within the management range of the sub-manager
(2) IP address at which the TCP connection is opened
(3) port number used by the node which is defined by smgSumTcpServerIpAddress
(4) IP address at which the TCP connection is opened (the other address defined by smgSumTcpServerIpAddress)
(5) port number used by the IP node which is defined by smgSumTcpClientIpAddress
(6) entry of the TCP connection information which is opened by the IP node of the management range In the definition examples of the sub-manager extension trap in FIG. 10, the following definition examples are shown:

(1) a trap for posting an addition of a system
(2) a trap for posting a deletion of a system
(3) a relay trap FIG. 11 shows a correspondence table 190 for converting the name of a management object of the MIB-II (hereinafter to be referred to as an "MIB-II object") which has been periodically and real-time collected by the sub-manager 10 into a management object name of the extension MIB. When MIB-II objects have been periodically and real-time collected from an agent which is loaded with management objects of the MIB-II in a standard manner, the names of the MIB-II objects are converted to names of management objects of the extension MIB.

Figure 12:
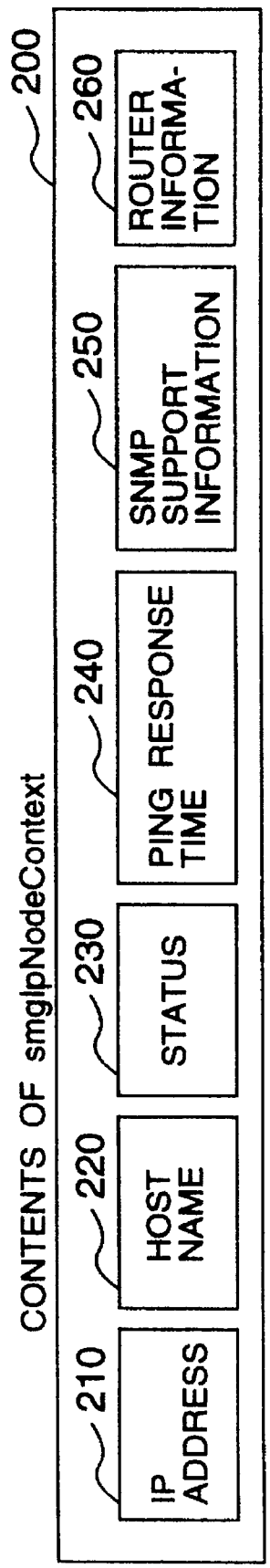
FIG. 12 is an explanatory diagram for showing the contents of smgIpNodeContext which is a sub-manager extension MIB.

FIG. 12 shows contents 200 of smgIpNodeContext which is a management object of the periodical collection MIB after conversion. As shown in FIG. 12, smgIpNodeContext is structured by an IP address 210, a host name 220, a status 230, a ping response time 240, SNMP support information 250 and router information 260.

When the integration manager 50 periodically collects a management object structured this way from the submanager 10 and makes a display of the management object, it is possible to display in one row a plurality of information relating to one agent or an IP node, so that it is possible to easily confirm the state of one agent or the IP node.

Figure 13:
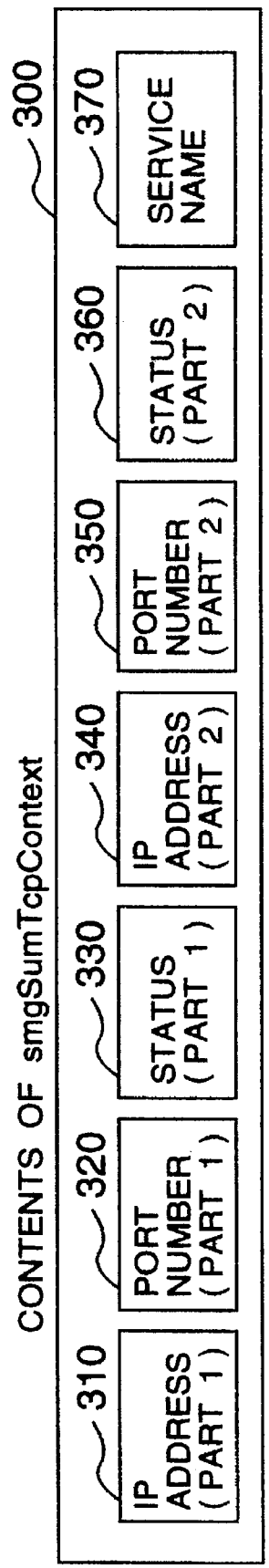
FIG. 13 is an explanatory diagram for showing the contents of smgSumTcpContext which is a sub-manager extension MIB.

FIG. 13 shows contents 300 of smgSumTcpContext which is a management object of the real-time collection MIB. As shown in FIG. 13, smgSumTcpContext is structured by an IP address (part 1) 310, port number (part 1) 320, a status (part 1) 330, an IP address (part 2) 340, a port number (part 2) 350, a status (part 2) 360 and a service name 370.

When the integration manager 50 periodically collects a management object structured this way from the sub-manager 10 and makes a display of the management object, it is possible to display in one row a plurality of information relating to one TCP connection, so that it is possible to easily confirm the state of one TCP connection.

In the periodical collection MIB, a management object name (identifier) to be used for totaling values of the periodical collection MIB is prepared as shown by a correspondence table 400 in FIG. 14. The periodical collection MIB is totaled according to the correspondence table 400.

An example of totaled management objects that have been collected by the integration manager 50 at every ten minutes interval is displayed in a graph as shown in FIG. 29.

(2) method of determining and method of monitoring a sub-manager management range smgCreateSystemTrap in FIG. 10 defines a sub-manager extension trap to be issued when an IP node has been added to a sub-manager management range. An extension trap number is "1", and a corresponding index number 520a in a management range table 500 shown in FIG. 16 is assigned to a variable list (Variable-bindings).

smgDeleteSystemTrap in FIG. 10 defines a sub-manager extension trap which is to be issued when an IP node has been deleted from the sub-manager management range. An extension trap number is "2", and a corresponding index number 520a in the management range table 500 is assigned to the variable list (Variable-bindings).

FIG. 15 is a diagram for showing the format of the environment setting file 180 which is used for determining the management range and monitoring range of a sub-manager. The environment setting file 180 includes an area for storing an obtaining community name 400, a setting community name 410, a trap destination 420, management range number 430, a management address range 440 and a trap relay interval 450 respectively.

The obtaining community name 400 is the name used for a certification when a request for obtaining an SNMP has been received. This name is also used when the sub-manager 10 issues a sub-manager extension trap.

The setting community name 410 is the name used for a certification when a request for setting an SNMP has been received.

The trap destination 420 is the other party IP address to which the sub-manger 10 issues a sub-manager extension trap, and the trap destination 420 can be assigned by a plurality of number like trap destinations 420a and 420b.

The management range number 430 is the information for assigning a maximum IP node number to be included in the management range of the sub-manager 10.

The management address range 440 is the information for assigning the IP address of an IP node which is within the management range, a community name, a polling interval and a time-out time. The management address range 440 can be assigned by a plurality of sets like 440a and 440b as shown in FIG. 15. An IP address range can be assigned in each set. For example, the management address range 440a indicates that an IP address can be assigned from 200.10.20.1 to 200.10.20.70.

The community name of the management address range 440 is used when the sub-manager 10 issues an SNMP request to the agent of the management range.

An initial value (a default value) of the polling interval for periodically collecting management objects of agents is set to five minutes, for example. An initial value of the time-out time is set to one second, for example. An initial value of the trap relay interval 450 is set to ten minutes, for example.

FIG. 16 is a diagram for showing the format of the management range table 500 to be provided inside the management range monitoring function 110. The management range table 500 is structured by a control unit and a plurality of entries, and a maximum entry number is the same as the value assigned by the management range number 430 in FIG. 15.

The control unit is structured by an area for storing the obtaining community name 510a, etc. The contents to be taken into this control unit from the environment setting file 180 will be explained below.

The obtaining community name 400 is set to the obtaining community name 510a, the setting community name 410 is set to the setting community name 510, the management range number 430 is set to the management range number 510c, and the destination number assigned by the trap destination 420 and the destination IP address are set to the trap destination number 510d and the trap destination table address 510e respectively. Other contents will be explained with reference to FIGS. 17 to 24.

Figure 17:
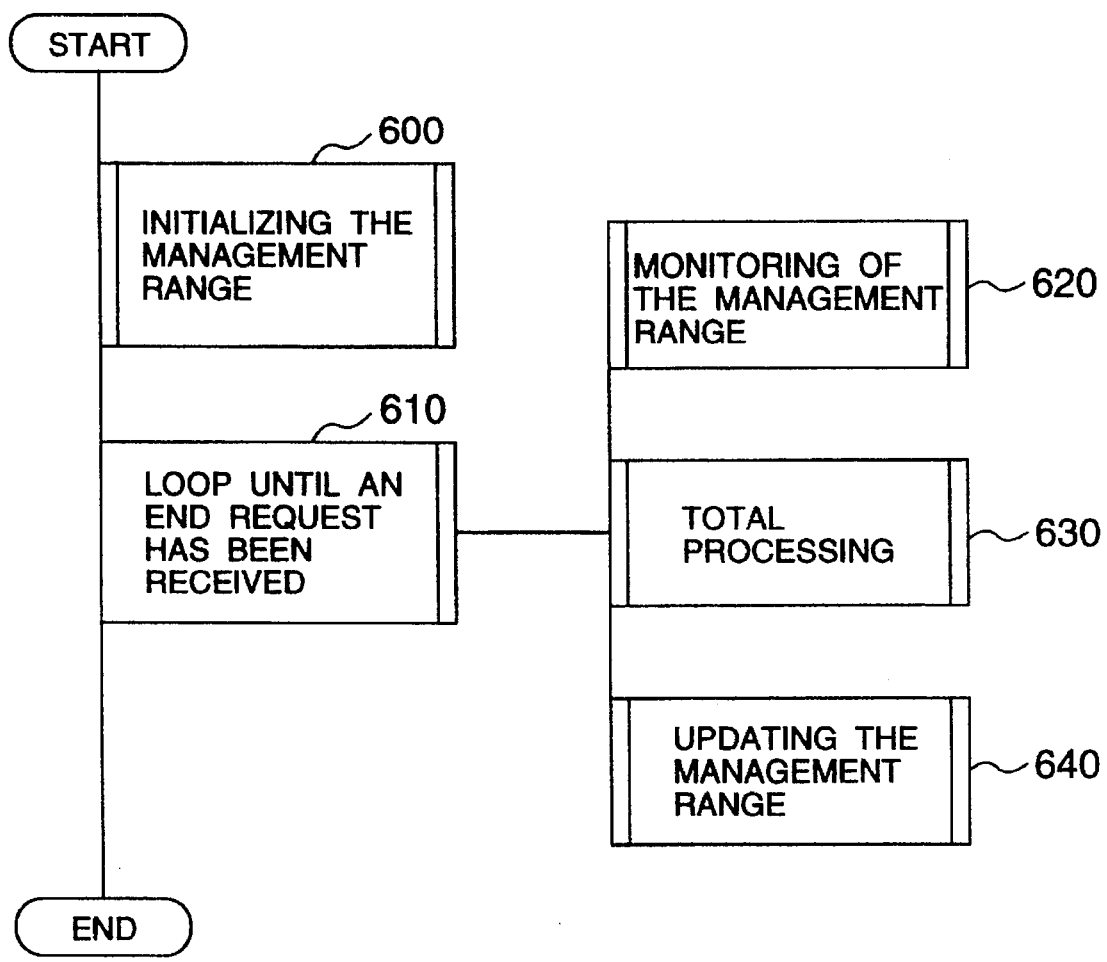
FIG. 17 is an outline PAD diagram of the monitoring method (main) of a management range.

FIG. 17 shows an outline of the main processing of the management range monitoring function 110. At first, the management range is initialized (step 600) and the processing is looped until a request for ending is received (step 610). During this period, monitoring of the management range (step 620), total processing (step 630) and updating of the management range (step 640) are carried out sequentially.

Figure 18:
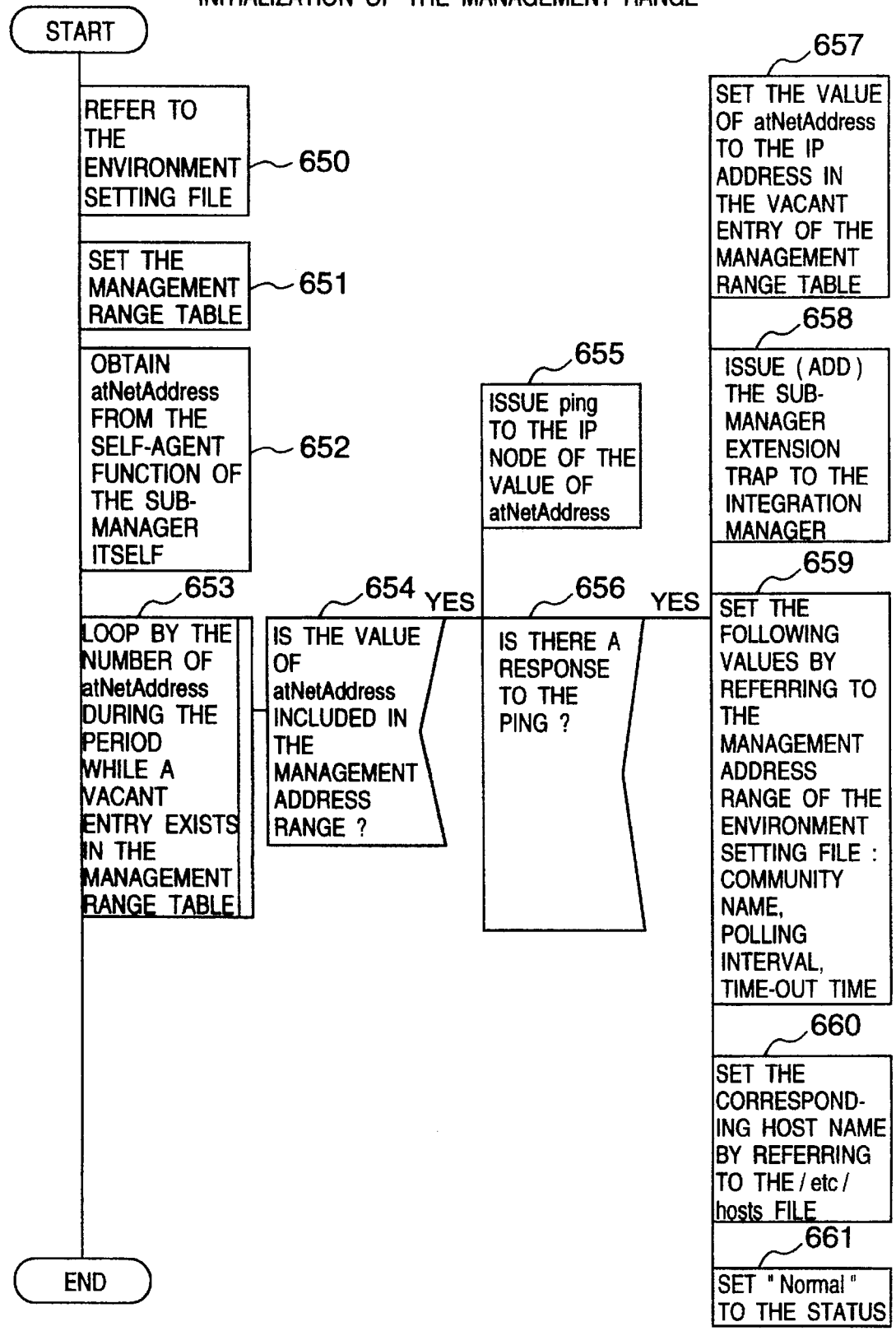
FIG. 18 is an outline PAD diagram of the initial setting of a management range.

FIG. 18 shows an outline of the initialization of the management range (step 600). The above-described environment setting file 180 is referred to and the management range table 500 is set (steps 650 and 651).

In order to set only an existing IP address out of the IP addresses assigned to the management address range 440 to the IP address 520b of the entry of the management range table 500, the following processing is carried out. At first, in order to obtain an IP address recognized by the sub-manager 10, atNetAddress which is an address conversion group of the MIB-II is obtained from the self-agent function 130 (step 652).

The value of the obtained atNetAddress shows a relationship between the IP address and the physical address. A blank address 520 exists in the management range table 500, and the processing loops during the period while the IP address of atNetAddress exists (step 653).

A decision is made whether the IP address of atNetAddress is included in the management address range 440 in FIG. 15 (step 654), and a ping is issued to only the IP address that is included (step 655).

A decision is made on the presence or absence of a response of the ping (step 656), and the IP address from which there has been a response is set to the IP address 520b of the blank entry 520 of the management range table 500. A sub-manager extension trap for posting that an IP node has been added to the management range is issued to the integration manager 50 (step 658).

Next, a community name relating to a corresponding IP address, a polling interval and time-out time are obtained from the management address range 440 of the environment setting file 180, and the community name 520c, the polling interval 520d and the time-out time 520e are set respectively (step 659).

Next, by referring to an /etc/host file (included in the information for each IP node in FIG. 6), the host name 520f of the corresponding IP address 520b is set (step 660). Then, "Normal" is set to the status 520g (step 661).

Figure 19:
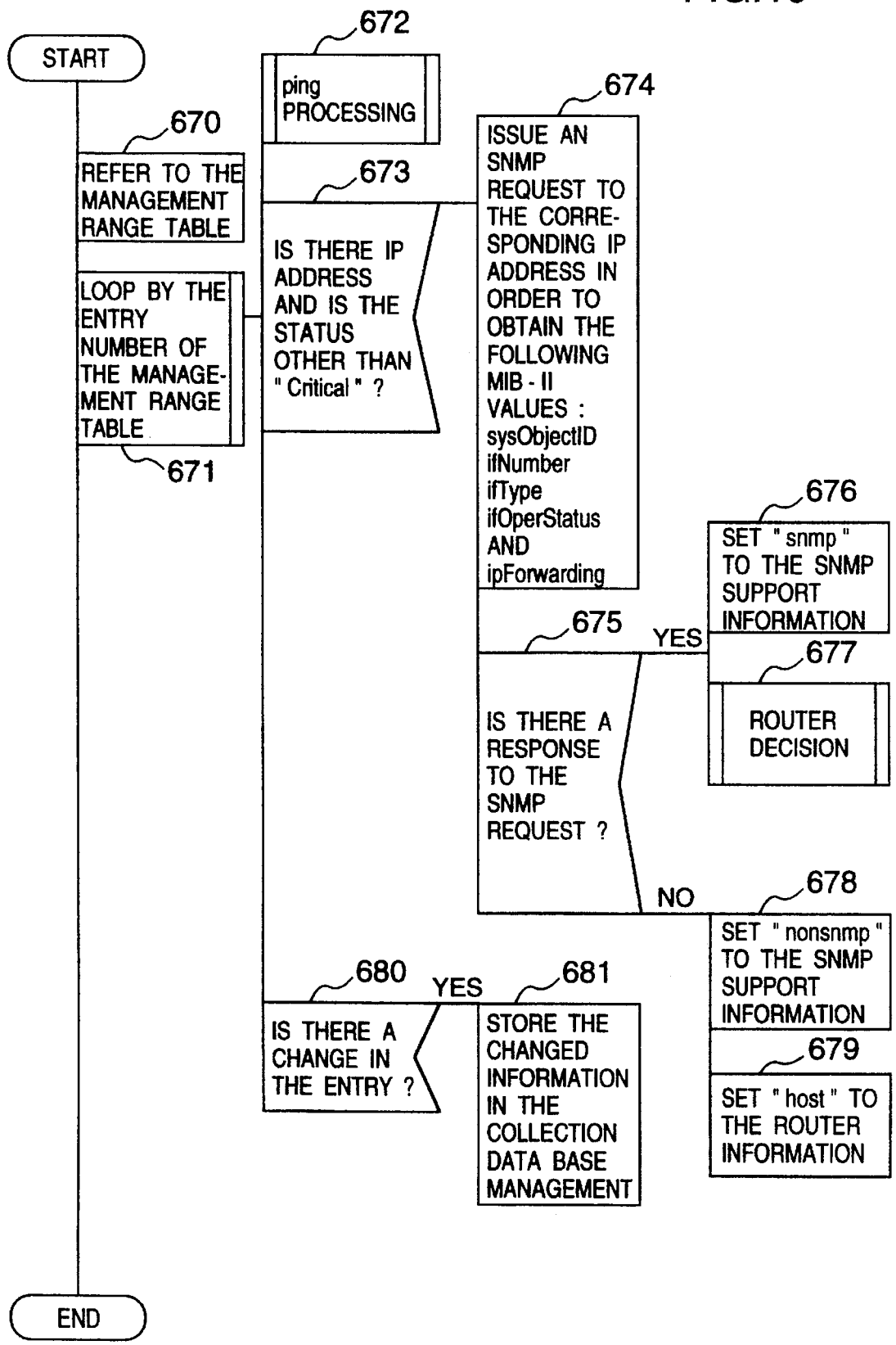
FIG. 19 is an outline PAD diagram of the monitoring of a management range.

FIG. 19 shows an outline of the monitoring of the management range (step 620).

By referring to the management range table 500 (step 670), the processing is looped by the number of entries 520 to which the IP address 520b is set.

During this period, the ping processing is carried out (step 672). A decision is made whether the IP addresses 520b are set to the corresponding entries 520 and whether the status 520g is other than "Critical" or not (step 673), and an SNMP request for obtaining values (reference FIG. 11) of MIB-II (sysObjectID, ifNumber, ifType, ifOperStatus and ifForwarding) is issued to the IP nodes which meed the above conditions (step 674).

Next, a decision is made on the presence or absence of a response to the SNMP request (step 675). If there has been a response, "snmp" is set to SNMP support information 520j of the corresponding entry 520 (step 676) and a router decision is made (step 677).

If there has been no response, "nonsnmp" is set to the SNMP support information 520j of the corresponding entry 520 (step 678), and "host" is set to router support information 520k (step 679).

Figure 20:
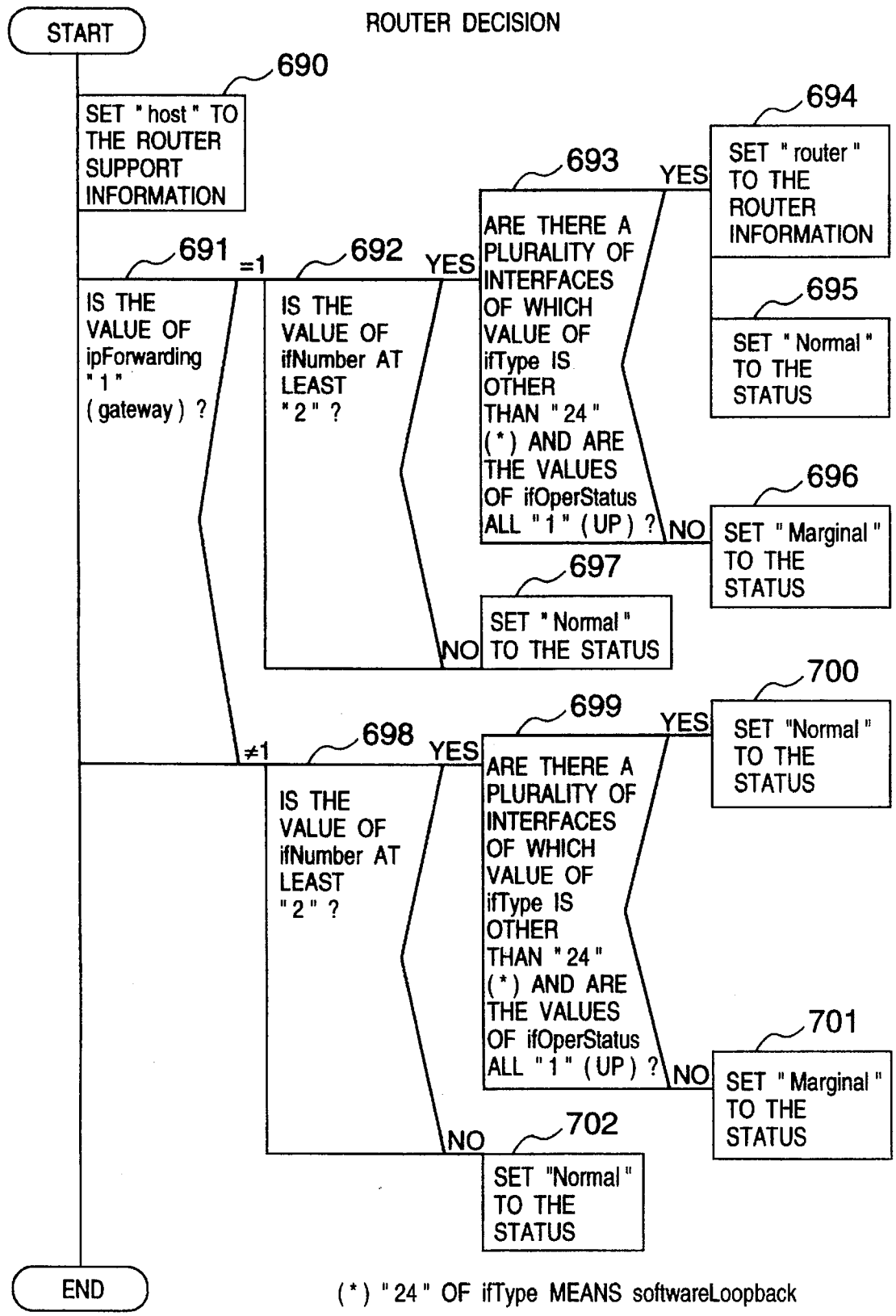
FIG. 20 is an outline PAD diagram of a router determination.

FIG. 20 shows an outline of the router decision (step 677). As an initial setting, the "host" is set to the router support information 520k (step 690). A decision is made to a value (reference FIG. 11) of ipForwarding of the MIB-ii (step 691), and if the value is "1" (gateway), the processing proceeds to step 692 and if the value is other than "1" (host) the processing proceeds to step 698.

A decision is made to a value of ifNumber of the MIS-II which shows an interface number (step 692), and if the value is at least "2", the processing proceeds to step 693 and if the value is "1", "Normal" is set to the status 520g (step 697).

A decision is made whether there exist a plurality of interfaces in which the value of ifType of the MIB-II is other than "24" (softwareLoopback) and whether all the values of ifOperStatus of the MIB-II that show the status is "1" (up) or not (step 693). If these conditions are met, "router" is set to the router support information 520k (step 694) and "Normal" is set to the status 520g (step 695).

If these conditions are not met, "Marginal" is set to the status 520g (step 696).

If the value of ipForwarding of the MIS-II is other than "1" (host) (step 691), a decision is made to the value of ifNumber of the MIS-II which shows the interface number (step 698). If the value is at least "2", the processing proceeds to step 699, and if the value is "1", "Normal" is set to the status 520g (step 702).

At the step 699, a decision same as that of the step 693 is carried out. If the conditions are met, "Normal" is set to the status 520g (step 700), and if the conditions are not met, "Marginal" is set to the status 520g (step 701).

Figure 21:
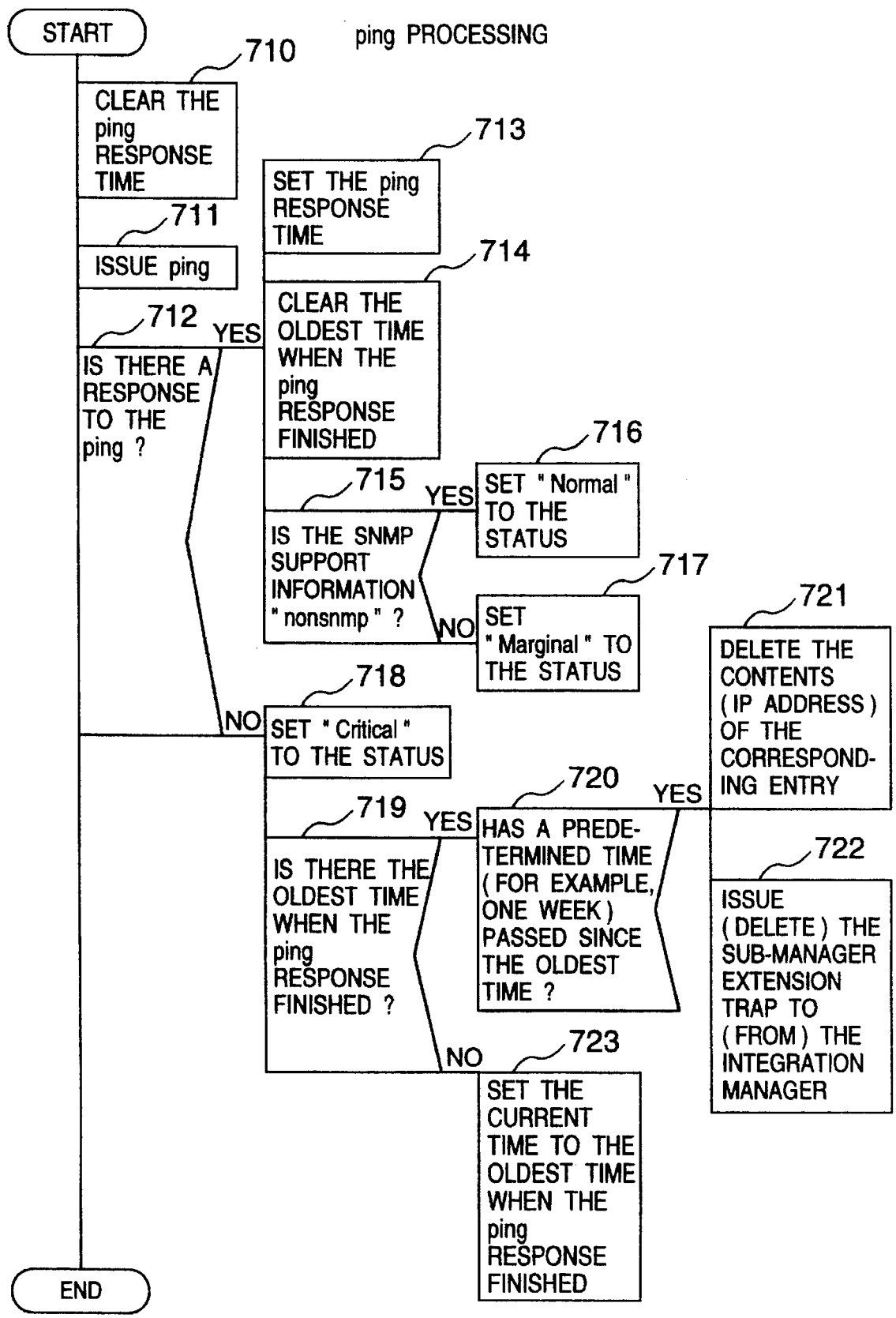
FIG. 21 is an outline PAD diagram of a ping processing.

FIG. 21 shows an outline of the ping processing (step 672).

At first, response time 520h of the ping of the corresponding entry 520 is cleared (step 710), a ping is issued to a specified IP address (step 711) and presence or absence of a response to the ping is confirmed (step 712). When there has been a response to the ping (step 712), the response time 520h of the ping of the corresponding entry 520 is set (step 713), the oldest time 520i when the response of the ping has finished is cleared (step 714), and a decision is made the SNMP support information 520j (step 715).

When the SNMP support information 520j is "nonsnmp", "Normal" is set to the status 520g (step 716), and when the SNMP support information 520j is "snmp", "Marginal" is set to the status 520g (step 717).

When there has been no response to the ping (step 712), "Critical" is set to the status 520g of the corresponding entry 520 (step 718), and the oldest time 520j when the ping response finished is confirmed (step 719).

When the oldest time 520i exists (step 719) and when a predetermined time (for example, a week) has passed (step 720), the contents 520a to 520k are deleted from the corresponding entry 520 (step 721) and a sub-manger extension trap for posting that the IP node has been deleted from the management range is issued to the integration manager 50 (step 722).

When the oldest time 520i does not exist (step 719), the current time is set (step 723).

FIG. 22 shows an outline of the total processing (step 630).

At first, portions 510f to 510k for counting the IP address numbers in the control unit of the management range table 500 are cleared, and the processing is looped by the number of the entries 520 (step 732). A count-up processing (+1) is carried out under the following conditions only when the IP address is set to a corresponding entry 520.

A count-up is carried out for smgTotalManageNodeNumber unconditionally (step 734), for smgTotalCriticalNodeNumber only when the status 520g is "Critical" (step 736), for smgTotalMarginNodeNumber only when the status 520g is "Marginal" (step 737), for smgTotalNormalNodeNumber only when the status 520 is "Normal" (step 738), for smgTotalRouteNodeNumber only when the router support information 520k is "route" (step 740), and for smgTotalSnmpSupportNodeNumber only when the SNMP support information 7420j is "snmp" (step 742), respectively.

If there is a difference between the number before the totaling and the number after the totaling (step 743), the difference information is stored in the collection data base management function 120 (step 744).

FIG. 23 shows an outline of the updating of the management range (step 640).

At first, the operation is started after confirming that a predetermined time, for example, three hours, have passed since the last updating (step 750).

The processing is looped for only the IP address where a blank entry 520 exists in the management range table 500, the status 520g is other than "Critical" and the SNMP support information 520j is "snmp" (step 751).

Next, an SNMP request is issued to the IP address 520b of the corresponding entry, for obtaining atNetAddress of the MIB-II (step 752).

When there has been a response to the SNMP request (step 752), the processing is looped during the period when the blank entry 520 exists and by the number of the IP addresses obtained (step 754), and the updating processing is carried out (step 755).

When there has been no response to the SNMP request (step 752), "Critical" is set in order to update the status 520g (step 756).

FIG. 24 shows an outline of the updating processing (step 755).

At first, a decision is made whether the IP address is the one which does not exist in the IP address 520b of the management range table 500 and whether the IP address is included in the management address range 440 of the environment setting file 180 (step 760), and the following processing is carried out only when the conditions are met.

The IP address is set to the blank entry 520 (step 761) and a sub-manger extension trap for posting that the IP node has been added to the management range is issued to the integration manager 50 (step 762).

By carrying out the above processing, the sub-manager 10 can limit the number of IP nodes to be included in the management range and can monitor only the existing IP nodes.

(3) method of allocating SNMP requests that have been received by the sub-manager The communication control function 100 receives SNMP requests from the integration manager 50 and the concentration function 150 of the sub-manager 10 and receives an SNMP trap from the agent 20.

The sub-manager agent function 140 allocates the SNMP requests inputted from the communication control function 100 based on management object identifiers and relays the allocated result to the collection MIB data base management function 120 or the concentration function 150.

The main reason for providing the two agents of the self-agent function 130 and the sub-manager agent function 140 is that it is necessary to process in parallel the SNMP request from the integration manager 50 and the SNMP request from the concentration function 150. To be more specific, based on the parallel processing of the SNMP requests, when SNMP requests have been received from the integration manager 50 to the real-time collection MIB of the sub-manager 10, it becomes possible for the concentration function 150 to issue an SNMP request to the self-agent function 130 through the communication control function 100 as an extension of the processing and to produce a real-time collection MIB value based on the result of the SNMP request and send a response of the SNMP to the integration manager 50.

Figure 25:
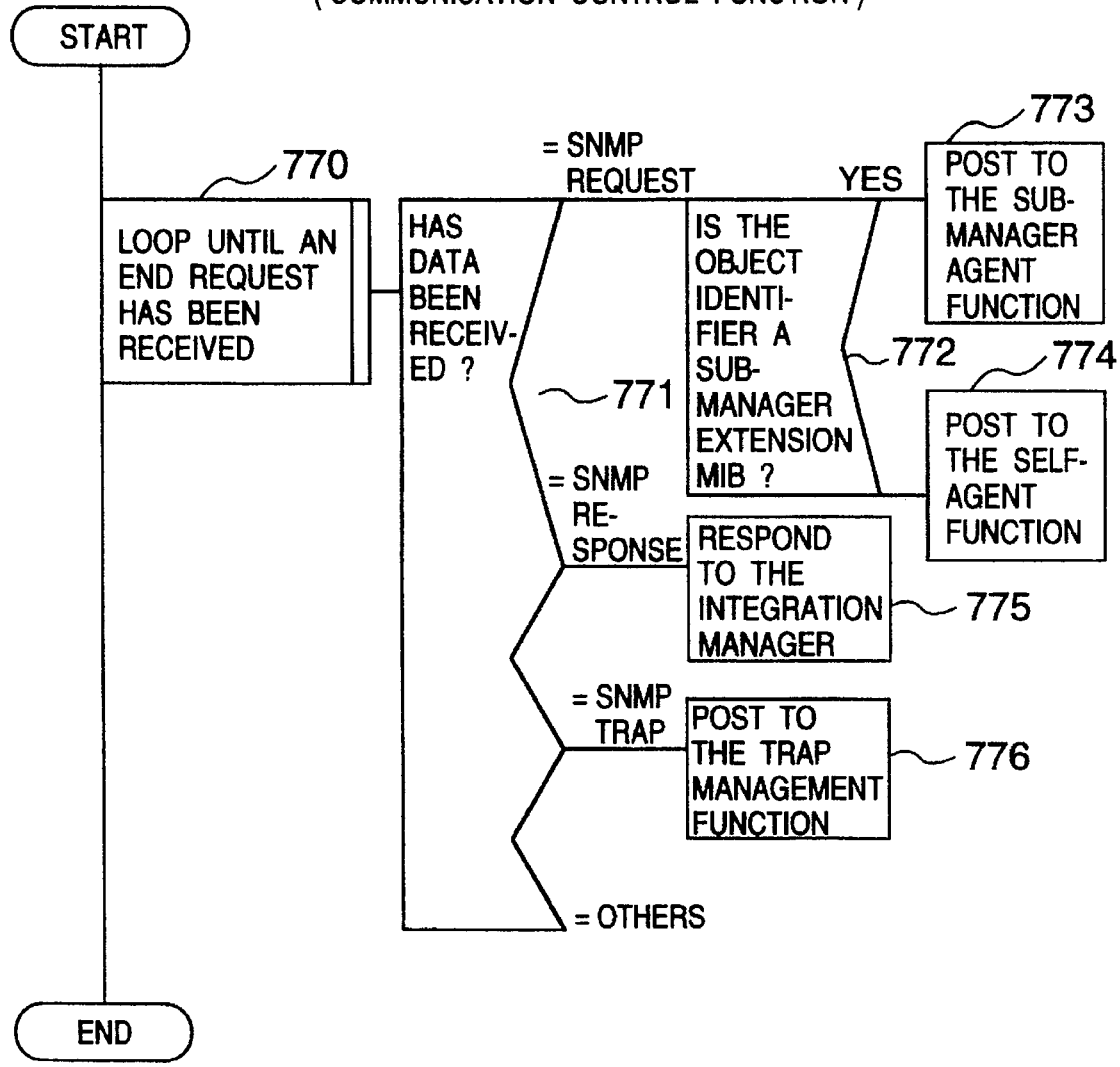
FIG. 25 is an outline PAD diagram of an allocation method in the communication control function.

FIG. 25 shows an outline of the method of allocating the SNMP requests by the management object of the communication control function 100. The communication control function 100 loops until an end request has been received (step 770). The data to be received by the communication control function 100 includes SNMP requests from the integration manger 50 and the concentration function 150 of the sub-manager 10, SNMP responses from the self-agent 130 and the sub-manager agent function 140, and SNMP traps from the agents, and a decision is made which one of these data has been received (step 771).

When an SNMP request has been received, a decision is made whether the object identifier is the sub-manager extension MIB in order to allocate the SNMP request by the management object identifier within the protocol of the SNMP request (step 772). If the object identifier is the sub-manager extension MIB, this fact is posted to the sub-manager agent function 140 (step 773). If the identifier is not the sub-manager extension MIB, this fact is posted to the self-agent function 130 (step 774).

On the other hand, when an SNMP response has been received, a response is made to the integration manager 50 (step 775).

When an SNMP trap has been received, this fact is posted to the trap management function 160 (step 776).

Figure 26:
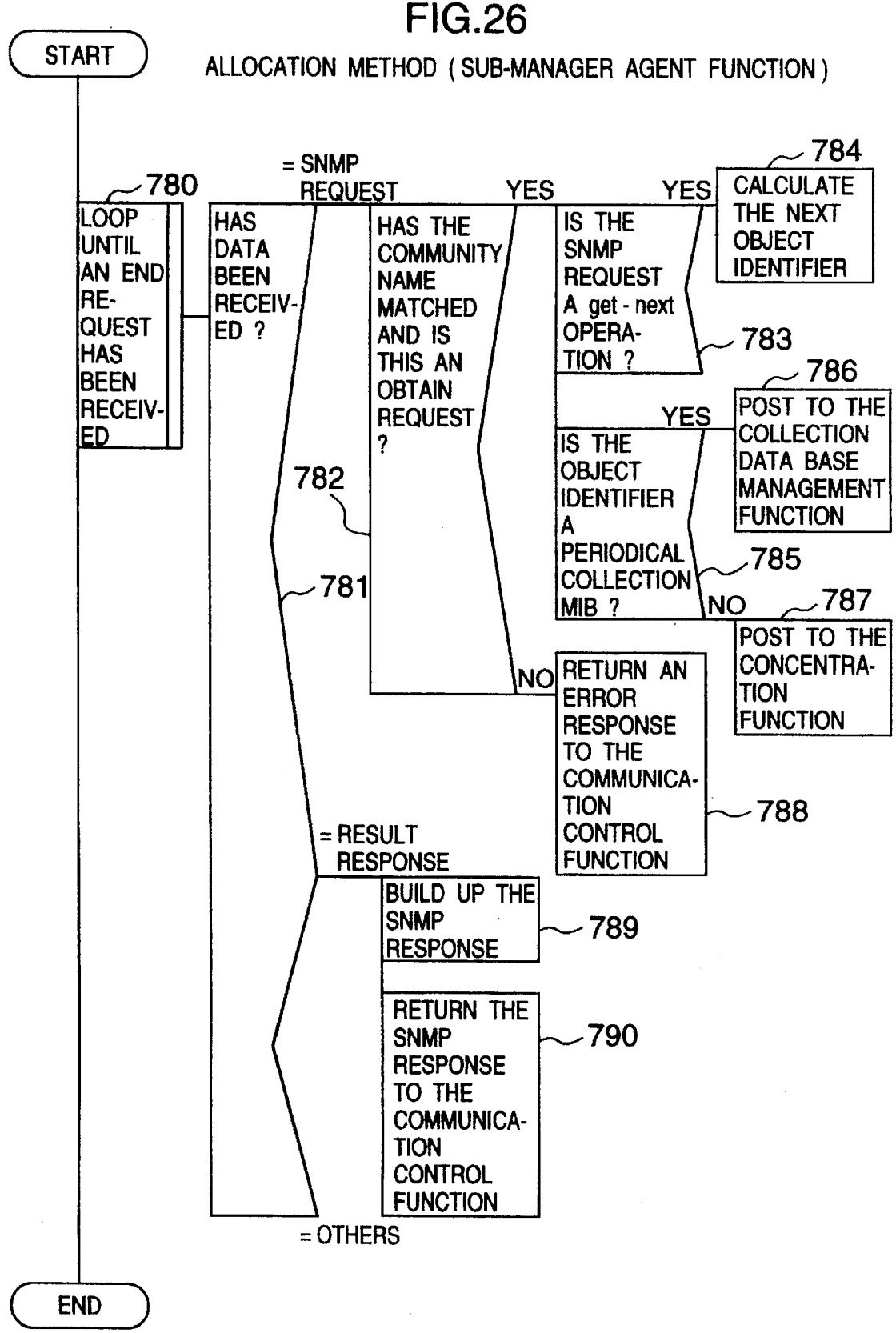
FIG. 26 is an outline PAD diagram of an allocation method in the sub-manager agent function.

FIG. 26 shows an outline of the method of allocation by the management object of the sub-manager agent function 140.

At first, the sub-manager agent function 140 loops until an end request has been received (step 780).

The data to be received by the sub-manager agent function 140 includes an SNMP request from the communication control function 100 and a response of the result of the MIB value from the collection data base management function 120 and the concentration function 150. Therefore, a decision is made which one of these has been received (step 781).

When an SNMP request has been received, a decision is made whether this is a request for obtaining an MIB and whether the community name matches or not (step 782). The confirmation of the community name is carried out by comparing the community name within the protocol of the SNMP request with the obtaining community name 400 shown in FIG. 15.

When the decision conditions of the above step 782 are met, a decision of the operation is made (step 783).

When the operation is get-next, the next assigned management identifier is obtained, and this is set as the requested management identifier (step 784). Next, a decision is made whether the object identifier is the periodical collection MIB or the real-time collection MIB (step 785). When the object identifier is the periodical collection MIB, this fact is posted to the collection data base management function 120 (step 786). When the object identifier is the real-time collection MIB, this fact is posted to the collection function (step 787).

If the decision conditions of the above step 782 are not met, an error response is returned to the communication control function (step 788).

On the other hand, when a result response has been received, an SNMP response is built up (step 789) and this response is sent to the communication control function 100 (step 790).

(4) method of managing the collection MIB in the collection data base management function 120

The method of carrying out an allocation management of a management object and building up a management object at the time of responding an MIB value will be explained below.

The collection data base management function 120 inputs individual information which structure the periodical collection information from the management range monitoring function 110 and stores the information both in the memory and in the collection MIB data base 170.

Figure 27:
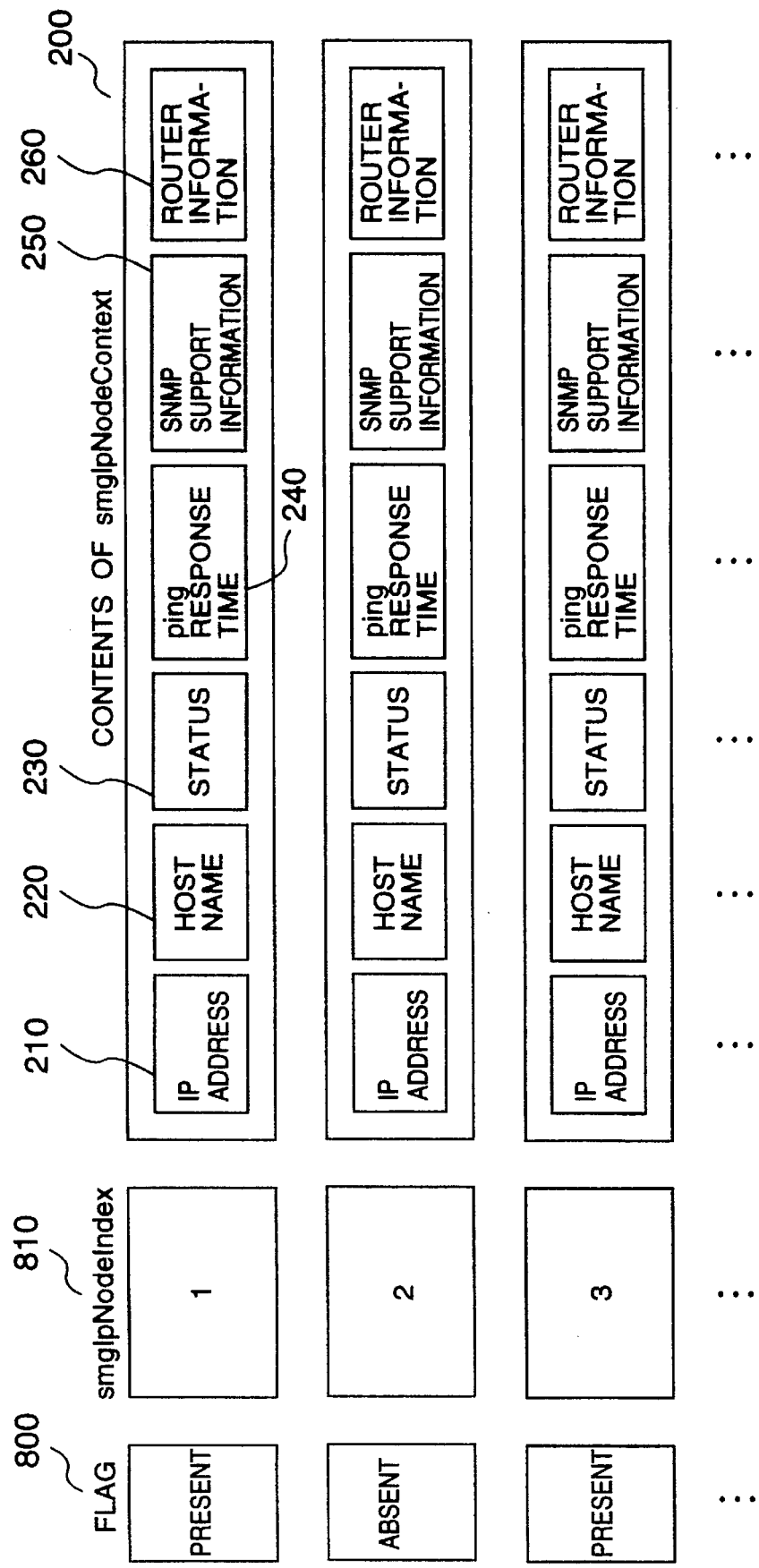
FIG. 27 is an explanatory diagram for showing an example of the contents of the periodical collection MIB value management table.

The individual information includes smgIpNodeIndex 810 and contents 200 of smgIpNodeContext, covering an IP address 210, a host name 220, a status 230, a ping response time 240, SNMP support information 250 and router information 260, as shown in FIG. 27.

The collection data base management function 120 carries out management of information in individual information units which structure a management object, not in management object unit which is the periodical collection MIB. The collection data base management function 120 is structured to reduce the volume of data to be exchanged between the collection data base management function 120 and the management range monitoring function 110, by inputting only the smgIpNodeIndex 810 which is the key information for specifying an IP node and an information unit to which there has been a change, for example, a status 230, from the management range monitoring function 110.

When an optional IP node has been deleted from the management range of the sub-manager 10, a request for deleting the smgIpNodeIndex 810 is inputted from the management range monitoring function 110 and the collection data base management function 120 changes the flag 800 from "presence" to "absence", thereby managing the IP node of the management range.

When a reference request to individual information that structure the periodical collection MIB has been received from the management range monitoring function 110, the collection data base management function 120 provides the smgIpNodeIndex 810 which is the key information and the requested individual information to the management range monitoring function 110. When mainly the sub-manager 10 has restarted, this information is also provided in order to make the relationship between the smgIpNodeIndex 810 and the IP address 210 shown in FIG. 27 to be the same as the relationship between the same before the restarting of the sub-manager 10.

The collection data base management function 120 stores the individual information that structure the periodical collection MIB in the collection MIB data base 170 in order to maintain the above relationship.

When the sub-manager 10 has received a request for obtaining the periodical collection MIB from the integration manager 50, the collection data base management function 120 receives a request for obtaining the periodical collection MIB value through the communication control function 100 and the sub-manager agent function 140.

The collection data base management function 120 builds up a periodical collection MIB value from individual information which structure the periodical collection MIB, and returns the result to the integration manager 50 through the sub-manager agent function 140 and the communication control function 100.

The build-up of the periodical collection MIB refers to the assembling of each information of the IP address 210 which shows one agent and IP node characteristics and IP status, the host name 220, the status 230, the response time 240 of the ping, the SNMP support information 250 and the router information 260, into the smgIpNodeContext 200 which is one management object, as shown in FIG. 27.

Figure 28:
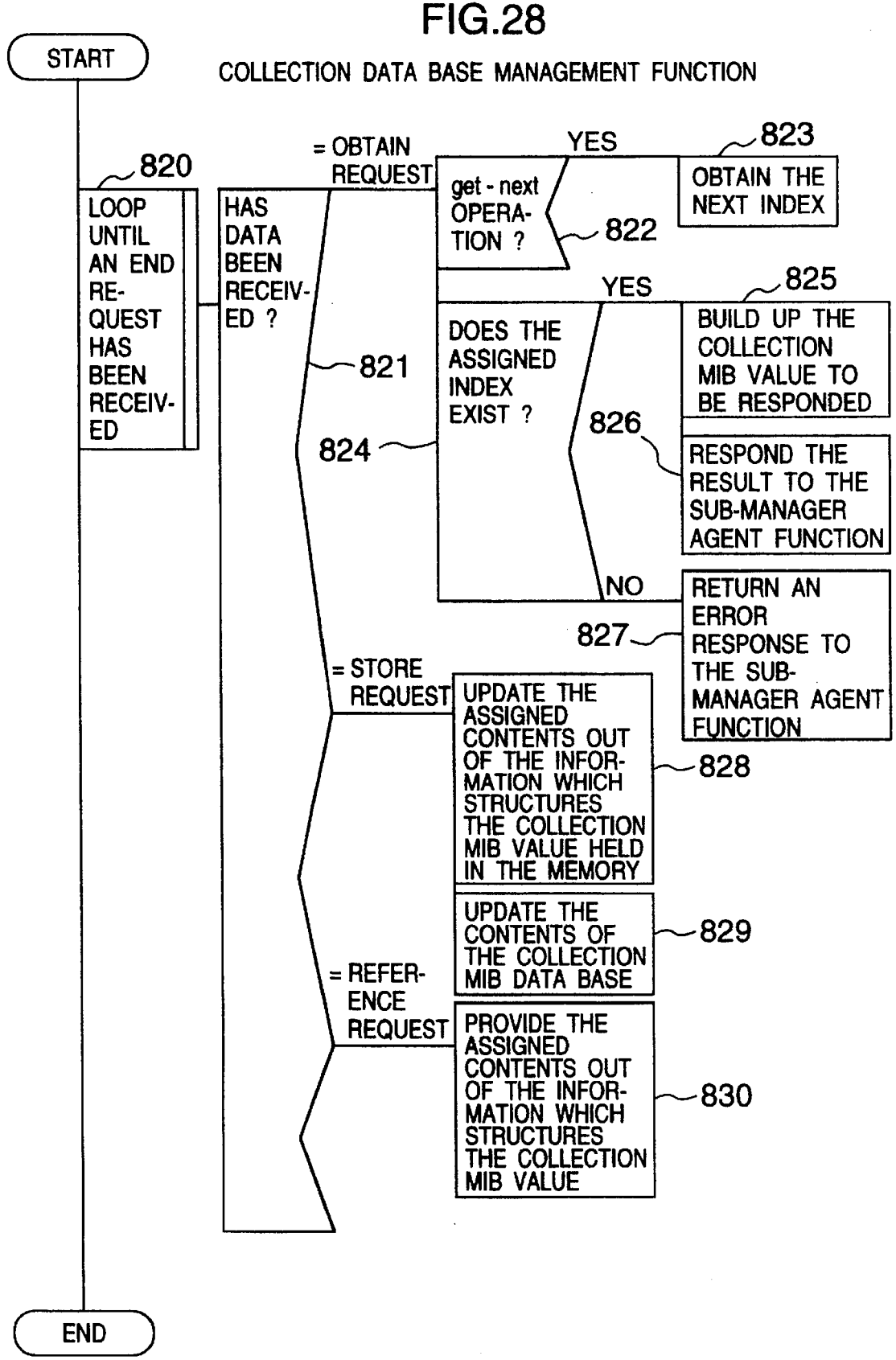
FIG. 28 is an outline PAD diagram of the collection data base management function.

FIG. 28 shows an outline of the operation of the collection data base management function 120.

The collection data base management function 120 loops until an end request has been received (step 820).

The data to be received by the collection data base management function 120 (step 821) includes a request for obtaining the periodical collection MIB from the sub-manager agent function 140, and a store request and a reference request from the management range monitoring function 110, so that a decision is made on what request has been received (step 821).

When an obtain request has been received, the collection data base management function 120 makes a decision of whether the request is the get-next operation (step 822), and if the request is the get-next operation, the collection data base management function 120 obtains the next assigned index (smgIpNodeIndex 810) (step 823).

At the next step 824, a decision is made on the presence or absence of the index by using the flag 800 in FIG. 27. This is mainly for the purpose of confirming the index assigned by the get operation.

When the index exists, a periodical collection MIB value to be responded is produced at step 825. If the smgIpNodeContext 200 has been requested, the periodical collection MIB is built up, and if a management object which expresses the total result of the periodical collection MIB shown in FIG. 14 has been requested, this is excluded from the build-up.

Then, the collection data base management function 120 responds the MIB value to the sub-manager agent function 140 (step 826). If the index does not exist, the collection data base management function 120 sends an error response to the sub-manager agent function 140 (step 827).

When a store request has been received, the management range monitoring function 110 inputs to the collection data base management function 120 the smgIpNodeIndex 810 which is the key information for structuring the periodical collection MIB and the contents 200 of the smgIpNodeContext to be updated, and retrieves the corresponding IP node by the key information. Then, the collection data base management function 120 updates the contents 200 of the smgIpNodeContext that is held in the memory (step 828).

In the case of adding or deleting an optional IP node to or from the management range of the sub-manager 10, the collection data base management function 120 updates (changes) the flag 800 in FIG. 27 to "presence" or "no" respectively.

Then, the collection data base management function 120 updates the collection MIB data base 170 (step 829).

An allocation management can not be carried out to the management object which expresses the totaling result of the collection MIB shown in FIG. 14, so that the MIB value is simply updated for this management object.

When a reference request has been received, the collection data base management function 120 provides the smgIpNodeIndex 810 which is the key information for structuring the periodical collection MIB and requested individual information out of the contents of the smgIpNodeContext are provided to the management range monitoring function 110 (step 830). Since the allocation management is not carried out to the management object which expresses the totaled result of the collection MIB shown in FIG. 14, the MIB value is simply provided.

(5) collection and concentration method in the concentration function 150

When a TCP connection as shown in FIG. 30 is available, for example, the concentration function 150 concentrates TCP connections 1000 between IP nodes of the management range and a TCP connection 1010 between the IP node of the management range and an IP node outside the management range. The concentration function 150 does not concentrate a TCP connection 1020 between IP nodes outside the management range. In other words, the concentration function 150 concentrates the TCP connections of which at least one end is an IP node and this IP node is loaded with the agent 20.

FIG. 31 shows a format of the index of tcpConnState of the MIB-II and the MIB value which the concentration function 150 collects from the agent of the management range.

FIG. 32 shows a real-time collection MIB of the sub-manager 10 and this shows a format of the index of smgSumTcpContext of which MIB value is requested from the integration manager and the MIB value.

FIG. 33 shows a relationship of the conversion between FIG. 31 and FIG. 32. The IP address (part 1) 310, the port number (part 1) 320, the IP address (part 2) 340 and the port number (part 2) 350 of the index of smgSumTcpContext requested from the integration manager 50 are used for a local IP address 1120, a local TCP port 1130, a remote IP address 1140 and a remote TCP port 1150 of the index of tcpConnState 1100.

A value 1160 of tcpConnState is set to the status (part 1) of smgSumTcpContext.

Similarly, the IP address (part 1) 310, the port number (part 1) 320, the IP address (part 2) 330 and the port number (part 2) 340 of the index of smgSumTcpContext are used for a remote IP address 1120, a remote TCP port 1130, a local IP address 1140 and a local TCP port 1150 of the index of tcpConnState 1110. A value 1170 of tcpConnState is set to the status (part 2) 360 of smgSumTcpContext.

The service name 370 of smgSumTcpContext is set by obtaining the service name corresponding to the port number (part 1) 320 or the port number (part 2) 350 by referring to the /etc/services file.

FIG. 34 explains the sequence of the index shown in FIG. 32, and this has a relation with the sequence of the entry 520 of the management range table 500.

In the IP address (part 1) 310, IP addresses 520b are arranged in order from the header of the entry. In the port number (part 1) 320 and the port number (part 2) 350, numbers are arranged in order from the smallest port number. In the IP address (part 2) 340, the addresses 520b are arranged in order starting from the entry next to the IP address (part 1) 310 and the last becomes an IP address outside the management range.

FIG. 35 shows an outline of the main processing of the concentration function 150, and this processing loops until an end request has been received (step 1200).

The concentration function 150 starts the operation when a request for obtaining the concentration MIB has been received from the sub-manager agent function 140 (step 1201). At first, a decision is made whether the operation is get operation or not (step 1202). If the operation is get operation, get processing is carried out (step 1203), and get-next processing is carried out in other case (step 1204).

Next, an error decision is carried out (step 1205). If there is no error, the concentration function 150 obtains the service name (step 1206) and builds up the contents of smgSumTcpContext to be responded (step 1207), and responds a result to the sub-manager agent function 140 (step 1208).

When there is an error, the concentration function 150 returns an error response to the sub-manager agent function 140 (step 1209).

FIG. 36 shows an outline of the get processing (the step 1203). At first, the index shown in FIG. 33 is broken down (step 1250), and the management range table 500 is referred to (step 1251) in order to make a decision whether the IP address is the one included in the management range or not (step 1252).

When only the IP address (part 1) is included in the management range, get issue is executed to only the IP address (part 1) (steps 1253 and 1254).

Similarly, when only the IP address (part 2) is included in the management range, get issue is executed to only the IP address (part 2) (steps 1255 and 1256).

When both IP addresses (part 1 and part 2) are included in the management range, get issue is first executed to the IP address (part 1) (steps 1257 and 1258), and only when there is no error, get issue is executed to the IP address (part 2) (steps 1259, 1260 and 1261).

When none of the IP addresses (part 1 and part 2) is included in the management range, an error is returned (step 1262).

FIG. 37 shows an outline of the get issue to be executed in FIG. 36.

In order to efficiently obtain the value of the MIB-II, the management range table 500 is referred to and a decision is made whether the status 520g of the IP address is "Marginal" or "Normal" and the SNMP support information 520j is "snmp" or not (step 1270).

When the above conditions are met, the management object identifier shown in FIG. 33 is exchanged (step 1271), and get request is issued (step 1272).

Next, a decision is made on the presence or absence of a response to the get request and an error decision is made (steps 1273 and 1274). When the conditions are met, an obtained result is returned (step 1275).

When the conditions in the step 1270, the step 1273 and the step 1274 are not met, an error is returned (steps 1278, 1277 and 1276).

FIG. 38 shows an outline of the get-next processing (step 1204).

At first, a decision is made on the presence or absence of an assignment of an index (step 1280). If there is an index assignment, the index is broken down in the same manner as at the step 1250 (step 1281).

If the index has not been assigned, the next index is calculated and executed in order to obtain the header index (step 1282).

Next, a decision similar to the one at the step 1252 in FIG. 36 is carried out in order to make a decision whether the IP addresses exist in the management range or not (step 1284).

If the decision is made that only the IP address (part 1) exists in the management range, get-next issue is executed to only the IP address (part 1) (steps 1285 and 1286).

Similarly, if the decision is made that only the IP address (part 2) exists in the management range, get-next issue is executed to only the IP address (part 2) (steps 1287 and 1288).

If the decision is made that both IP addresses (part 1 and part 2) exist in the management range, get-next issue is executed first to the IP address (part 1) (steps 1289 and 1290), and get-next issue is executed to the other address of the connection only when there is no error (steps 1291, 1292 and 1293).

An error is returned when none of the IP addresses (part 1 and part 2) is included in the management range (step 1294).

FIG. 39 shows an outline of the calculation of the next index.

At first, a decision is made on the presence or absence of the assigned index (step 1300). If the assigned index does not exist, the management range table 500 is sequentially retrieved from the header entry in order to obtain the header index. The IP address 520b of which status 520g is "Marginal" or "Normal" and the SNMP support information is "snmp" is set as the new IP address (part 1) 310 (step 1301).

"0" is set to the port number (part 1) 320, "0.0.0.0" is set to the IP address (part 2) 340, and "0" is set to the port number (part 2) 350.

If the index exists at the step 1300, in order to efficiently obtain the next index, the management range table 500 is sequentially retrieved, and according to the sequence of index shown in FIG. 34, the IP address 520b which is after the IP address (part 1) 310b and of which status 520g is "Marginal" or "Normal" and of which SNMP support information is "snmp" is set as the new IP address (part 1) 310 (step 1305).

Figure 40:
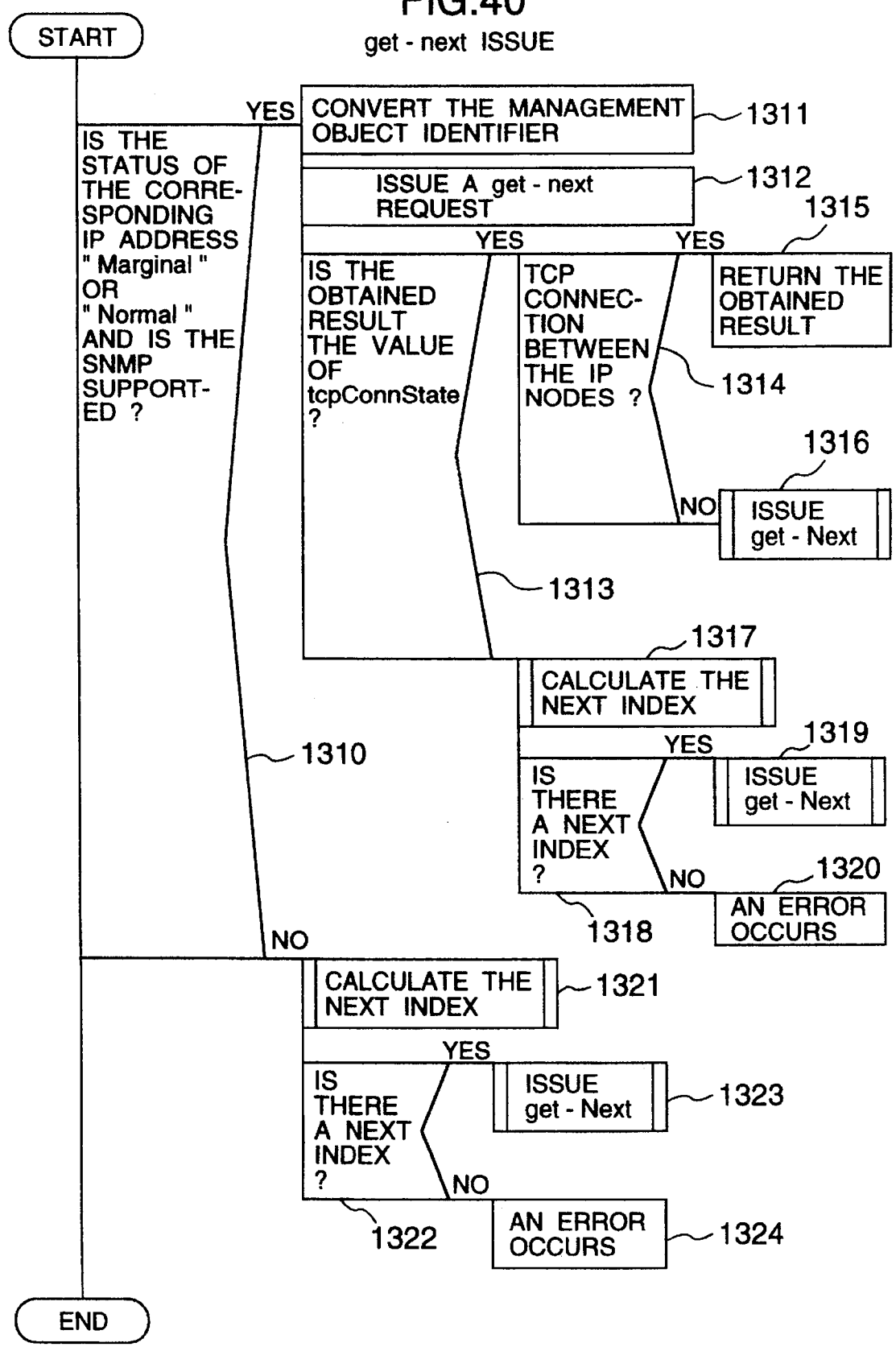
FIG. 40 is an outline PAD diagram of the concentrating method (get-next issuing) of a management range.

FIG. 40 shows an outline of the get-next issue to be executed in FIG. 38.

In order to efficiently obtain the value of the MIB-II, the management range table 500 is referred to and a decision is made whether the status 520g of the IP address is "Marginal" or "Normal" and the SNMP support information 520j is "snmp" or not (step 1310).

When the above conditions are met, the management object identifier shown in FIG. 33 is exchanged (step 1311), and get request is issued (step 1312).

Next, a decision is made to the management object identifier of the obtained result (step 1313). If the obtained result is the value of tcpConnState, a decision is made whether the TCP connection is the one between the IP nodes (step 1314).

If the TCP connection is the one between the IP nodes, the obtained result is returned (step 1315), and if the TCP connection is not for between the IP nodes, get-next issue is executed again (step 1316).

If the obtained result is not tcpConnState at the step 1313, the next index calculation is executed and a decision is made on the presence or absence of the index (steps 1317 and 1318). When the next index exists, get-next issue is executed (step 1319), when the next index does not exist, an error is returned (step 1320).

When the conditions at the step 1310 are not met, the processing similar to those at the step 1317 to the step 1320 are carried out.

(6) method of reducing SNMP traps in the trap management function 160 smgIntermediaryTrap shown in FIG. 10 defines the sub-manager extension trap to be relayed by the sub-manager 10 in order to reduce the number of the management packets that are used by the SNMP trap, and the extension trap number is "3".

The community name 400 for obtaining the environment setting file 180 explained in FIG. 15 is also used when the sub-manager 10 issues the sub-manager extension trap. The trap destination 420 is the other IP address to which the sub-manager 10 issues the sub-manager extension trap, and this trap destination 420 can be assigned by a plurality of number. The trap relay interval 450 is the time for storing the SNMP trap which has been received from the agent 20 that is the management range of the sub-manager. When the SNMP trap has been received during this period, this is arranged in one sub-manager extension trap and is relayed to the integration manager 50.

FIG. 41 shows an outline for converting the SNMP trap, that has been received by the sub-manager 10 from the agent 20 of the management range, into the sub-manager extension trap.

A format 1400 of smgIntermediaryTrap which is the sub-manager extension trap is structured by a trap header 1410 and Variable-bindings 1420.

The trap header 1410 is structured by enterprise 1411, agent-addr 1412, generic-trap 1413, specific-trap 1414 and time-stamp 1415, each of these elements describes sysObjectID of the sub-manager 10, IP addresses "6" and "3" of the sub-manager 10 and sysUpTime of the sub-manager 10.

The contents of the received SNMP trap are sequentially described in the Variable-bindings 1420.

FIG. 42 shows the details for converting the SNMP trap into the sub-manager extension trap.

The Variable-bindings 1420 of the format 1400 of smgIntermediaryTrap is structured by mainly smgIpNodeIndex 1430, smgEnterprise 1431, smgAgentAddr 1432, smgGeneridTrap 1433, smgSpecificTrap 1434 and VarBindList 1435.

The index number 520a of the management range table 500 corresponding to agent-addr 1462 that is the IP address to which the SNMP trap has been issued is described in the smgIpNodeIndex 1430.

Items of enterprise 1461, the agent-addr 1462, generic-trap 1463 and specific-trap 1464 are described in the smgEnterprise 1431, the smgAgentAddr 1432, the smgGeneridTrap 1433 and the smgSpecificTrap 1434 respectively.

Variable-bindings 1470 of the SNMP trap that has been received is described in the VarBIndList 1435.

FIG. 43 shows an outline of the method for reducing the SNMP trap.

At first, the trap management function 160 refers to the environment setting file 180 (step 1500) and loops the processing until an end request has been received (step 1501).

Next, the trap management function 160 secures a buffer (step 1502), loops the processing during the period of the trap relay interval 450 (reference FIG. 15) (step 1503), and receives the SNMP trap (step 1504).

In order to confirm that the received SNPM trap is the one from the agent 20 of the sub-manager management range, the trap management function 160 refers to the IP address 520b and the index 520a in the management range table 500 (step 1505).

If the received SNPM trap is the one issued by the agent 20 of the sub-manager management range, the trap management function 160 stores the index 520a and the SNMP trap that has been received in the buffer (steps 1506 and 1507).

The trap management function 160 builds up the sub-manager extension trap from the contents of this buffer (step 1508) and issues the sub-manager extension trap to the integration manager 50 (step 1509). Then, the trap management function 160 releases the buffer (step 1510).

Details of the sub-manager 10 which is the main element of the present invention have been explained above. According to the present embodiment, there are the following effects when the integration manager 50 refers to the periodical collection MIB and real-time collection MIB which are the extension MIB of the sub-manager 10.

(1) when the periodical collection MIB is referred to

When the sub-manager 10 periodically issues the ping (ICMP echo request packet) and the SNMP request packet to the IP node of the sub-manager management range and holds the result of the response to these issues as the periodical collection MIB which is one of the sub-manager extension MIB, it is possible to make an immediate response to a request from the integration manager 50 for obtaining an SNMP.

The periodical collection MIB consists of the management object identifier which expresses the characteristics (index, IP address, host name, IP status, ping response time, SNMP loading flag, IP router loading flag) of the IP nodes of the sub-manager management range in 1 (management object identifier/IP node) and the management object identifier which is the individual characteristics totaled by the number of the IP nodes. Accordingly, the network manager at the side of the integration manager 50 can confirm, depending on the application, the structure information and status information of the sub-manager management range by referring to the periodical collection MIB of the sub-manager 10.

Further, it is possible to reduce the number of the management packets between the integration manager 50 and the sub-manager 10 by the number of the concentration of the periodical collection MIB.

(2) when the real-time collection MIB is referred to

According to the request from the integration manger 50 to the sub-manager 10 for referring to the real-time collection MIB, the management object of each agent is collected, totaled and returned to the integration manager 50 in real time. Accordingly, it is possible to accept the latest status of the sub-manager management range with small resource (CPU power and memory capacity) and small number of management packets. It is also possible to reduce time error between the agents.

Further, by managing the TCP collection information of the sub-manager management range as the real-time collection MIB, it is possible to specify high traffic IP node and service of the management range of the sub-manager 10 in small operation of the integration manager 50. Further, it is possible to reduce the number of management packets between the integration manager 50 and the sub-manager 10 as compared with the case where the sub-manager 10 does not exist.

Further, by issuing the sub-manager extension trap, it is possible to efficiently transmit to the integration manager 50 the changes of the sub-manager management range and SNMP trap received from the agent.

In the logical relation diagram shown in FIG. 2, the hierarchy from the agent to the integration manager is three layers. However, the hierarchy is not limited to this according to the present invention.

We claim:

1. A hierarchical network management system, comprising:

a plurality of agents, connected to a communication network, for managing and controlling information, respectively, of a plurality of resources;

a sub-manager, having a predetermined agent group under management, for managing and controlling a portion of management objects of said communication network through said predetermined agent group; and an integration manager for managing and controlling all management objects of said hierarchical communication network through said sub-manager, said hierarchical network management system using an SNMP as a communication protocol between said agents and said sub-manager and between said sub-manager and said integration manager, respectively, and said hierarchical network management system having periodic collecting means for periodically collecting within said sub-manager management objects of a management range of said sub-manager through said predetermined agent group, and for posting collected information to said integration manager at a reference request of said integration manager.

2. A hierarchical network management system according to claim 1, wherein said periodic collecting means periodically collects management objects including management objects which are not loaded with agents or which are not started yet.

3. A hierarchical network management system according to claim 1, wherein said periodic collecting means concentrates a plurality of information relating to each agent managed by a plurality of identifiers and posts said concentrated result to said integration manager, at a reference request of said integration manager.

4. A hierarchical network management system according to claim 1, further including means in said sub-managers for analyzing an SNMP trap received from an agent that exists in the management range of said sub-manager and for relaying a plurality of SNMP traps to said integration manager as a sub-manager single extension trap.

5. A hierarchical network management system according to claim 1, further including real-time collecting means in said sub-manager for real-time collecting a status of agents which belong to the management range of said sub-manager and for posting collected information to said integration manager, at a reference request of said integration manager.

6. A hierarchical network management system according to claim 5, wherein said real-time collecting means selects objects for a real-time collection by referring to management objects that have been collected by said periodical collecting means.

7. A hierarchical network management system according to claim 5, wherein said real-time collecting means concentrates a plurality of information relating to each agent managed by a plurality of identifiers and posts a concentrated result to said integration manager, at a reference request from said integration manager.

8. A hierarchical network management system, comprising:

a plurality of agents connected to a first communication network;

a sub-manager connected to said first communication network and having a predetermined agent group within said plurality of agents under management;

an integration manager connected to a second communication network and having said sub-manager under management; and a communication path for combining said first and second communication networks, wherein each of said agents manages and controls management objects relating to structure information and status information of each of a plurality of resources, said sub-manager manages and controls management objects of said first communication network through said predetermined agent group, said integration manager accesses said sub-manager through said communication path to thereby manage and control a hierarchical communication network structures by said first and second communication networks through said sub-manager, and said sub-manager includes means for functioning as an agent to said integration manager and for functioning as a manger to said agents, so that a Simple Network Management Protocol (SNMP) can be employed as a communication protocol between each of said plurality of agents and said sub-manager and between said sub-manager and said integration manager through said communication path.

9. A hierarchical network management system, comprising:

a plurality of lower communication networks;

a plurality of agents connected to each of said lower communication networks;

a plurality of sub-managers connected to respective ones of said lower communication networks, each of said plurality of sub-managers having under management a predetermined agent group, within the plurality of agents connected to a respective one of said lower communication networks;

an integration manager connected to a higher communication network and having said plurality of sub-managers under management of said integration manager; and a communication path for connecting said plurality of lower communication networks and said higher communication network, wherein each of said agents manages and controls management objects relating to structure information and status information of each of a plurality of resources, each of said sub-managers manages and controls management objects of a respective one of said lower communication networks through the agent group under management of said sub-manager, said integration manager accesses said sub-managers through said communication path to thereby manage and control management objects of a hierarchical communication network structured by said higher communication network through said plurality of sub-managers, and said each of said sub-managers includes means for functioning as an agent to said integration manager and for functioning as a manager to said agents, so that a Simple Network Management Protocol (SNMP) can be employed as a communication protocol between each of said sub-managers and said integration manager through said communication path.

10. A hierarchical network management system according to claim 8, wherein said means for functioning as said agent to said sub-manager processes a management object of said first communication network collected through said agent group under management of said sub-agent into a Management Information Base (MIB) value for responding to said integration manager at an inquiry from said integration manager.

11. A hierarchical network management system according to claim 9, wherein said means for functioning as said agent to each of said sub-managers processes a management object of said lower communication network collected through an agent group under management of said sub-agent into a Management Information Base (MIB) value for responding to said integration manager at an inquiry from said integration manager.

12. A system for hierarchically managing a communications network, comprising:

a plurality of resources;

a plurality of agents, connected to the communications network, for managing management objects of respective ones of said plurality of resources;

a sub-manager for managing, through management of a predetermined group of agents within said plurality of agents, a portion of the management objects of said plurality of resources, said sub-manager communicating with said plurality of agents using a simple network management protocol;

an integration manager for managing, through said sub-manager, all of said management objects of said plurality of resources;

a communications path connecting said integration manager to said sub-manager, said integration manager communicating with said sub-manager along said path using a simple network manager protocol; and collecting means for periodically collecting within said sub-manager, through said predetermined group of agents, management objects lying in a management range defined for said sub-manager, and for posting to said integration manager information including said collected management objects in response to a reference request issued from said integration manager.

13. The system recited in claim 12, wherein said management objects include management objects of structure information and status information.

14. A hierarchical network management system, comprising:

a first communications network;

a plurality of agents connected to said first communications network;

a plurality of groups of resources, each of said plurality of agents managing management objects of a respective group of said plurality of groups of resources;

a sub-manager, connected to said first communications network, for managing, through management of a predetermined group of agents within said plurality of agents, management objects of resources being managed by said predetermined group of agents, said sub-manager communicating at least with said predetermined group of agents through a simple network management protocol;

a second communications network;

a communications path for connecting said first and second communications networks;

an integration manager, connected to said second communications network, for managing said sub-manager, said integration manager communicating with said sub-manager through said communications path using a simple network management protocol and cooperating with said sub-manager to manage a hierarchical communications network which includes said first and second communications networks; and means, within said sub-manager, for functioning as an agent to said integration manager and for functioning as a manger to said predetermined group of agents.

15. The hierarchical network management system recited in claim 14, wherein said management objects include management objects of structure information and status information.

16. A hierarchical network management system, comprising:

a plurality of lower-level communications networks;

a plurality of sets of agents, each set of agents connected to a respective one of said plurality of lower-level communications networks, with the agents in each set of agents managing management objects of respective ones of a plurality of resources;

a plurality of sub-managers connected to respective ones of said lower-level communications networks, each of said sub-managers managing, through management of a predetermined group of agents within the set of agents connected to the lower-level communication network to which said each sub-manager is connected, management objects being managed by said predetermined group of agents, each sub-manager communicating with at least the predetermined group of agents being managed by said each sub-managers using a simple network management protocol;

a higher-level communications network;

a communications path for connecting said higher-level communications network to said plurality of lower-level communications networks;

an integration manager, connected to said higher-level communications network, for managing said plurality of sub-managers to control management objects being managed by the agents in the predetermined groups of agents being managed by said sub-managers, said integration manager communicating with said plurality of sub-managers through said communications path using a simple network management protocol;

wherein each of said plurality of sub-managers includes means for functioning as an agent to said integration manager and for functioning as a manager to each agent in the set of agents being managed by said each of said plurality of sub-managers.

17. The hierarchical network management system recited in claim 16, wherein said management objects include management objects of structure information and status information.

* * * * *